United States Patent
Zach

(10) Patent No.: US 10,078,886 B2
(45) Date of Patent: Sep. 18, 2018

(54) IMAGE ADJUSTMENT

(71) Applicant: Kabushiki Kaisha Toshiba, Minato-ku (JP)

(72) Inventor: Christopher Zach, Cambridge (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/455,849

(22) Filed: Mar. 10, 2017

(65) Prior Publication Data

US 2017/0278223 A1 Sep. 28, 2017

(30) Foreign Application Priority Data

Mar. 22, 2016 (GB) .................... 1604792.0

(51) Int. Cl.
*G06K 9/00* (2006.01)
*G06T 5/00* (2006.01)
*G06T 7/11* (2017.01)

(52) U.S. Cl.
CPC ............... *G06T 5/002* (2013.01); *G06T 7/11* (2017.01)

(58) Field of Classification Search
CPC .................... G06T 5/002; G06T 7/11
See application file for complete search history.

(56) References Cited

U.S. PATENT DOCUMENTS

| | | | | |
|---|---|---|---|---|
| 2012/0327172 A1* | 12/2012 | El-Saban | ........... | G06K 9/00228 348/14.02 |
| 2014/0333615 A1* | 11/2014 | Ramalingam | ........... | G06T 17/00 345/420 |
| 2016/0199649 A1* | 7/2016 | Barnes | ............... | A61N 1/36046 382/128 |
| 2017/0006261 A1* | 1/2017 | Debilde | ................... | H04N 7/18 |
| 2017/0076446 A1* | 3/2017 | Pedersen | ............... | G06T 7/0012 |
| 2017/0236290 A1* | 8/2017 | Sorkine Hornung | ....................... | G06T 7/0081 382/173 |

FOREIGN PATENT DOCUMENTS

WO WO 2010/135586 A1 11/2010
WO WO 2012/123505 A2 9/2012

OTHER PUBLICATIONS

F. Besse, et al., "PMBP: PatchMatch Belief Propagation for Correspondence Field Estimation", 11 pages.
GB Search Report dated Sep. 30, 2016 in GB Application Serial No. 1604792.0, 3 pages.

* cited by examiner

*Primary Examiner* — Jonathan S Lee
(74) *Attorney, Agent, or Firm* — Oblon, McClelland, Maier & Neustadt, L.L.P.

(57) ABSTRACT

A method for adjusting an image using message passing comprises associating each pixel of an image with a node of a graph and one or more cliques of nodes, determining for a node of the graph a respective set of possible pixel labels for which a unary potential is known, computing for that node a unary potential of a possible pixel label for which the unary potential is unknown, adjusting a clique potential associated with each clique to which that node belongs based on the unary potentials, and adjusting, based on the adjusted clique potential associated with each clique to which that node belongs, at least one of the messages between that node and the other nodes of each clique. Once a convergence criterion is met, an adjusted image is produced having pixel labels determined from the adjusted messages.

14 Claims, 12 Drawing Sheets
(6 of 12 Drawing Sheet(s) Filed in Color)

(a) Cones (900×750, 120 labels)

(b) Teddy (900×750, 120 labels)

(c) Aloe (1282×1110, 240 labels)

IMAGE ADJUSTMENT

FIELD

This disclosure relates to image processing. In particular, but without limitation, this disclosure relates to a method of adjusting an image using message passing.

BACKGROUND

As computer vision and image processing systems become more complex, it is increasingly important to build models in a way that makes it possible to manage this complexity.

Maximum a-posteriori (MAP) inference in graphical models, and especially in random fields defined over image domains, is one of the most useful tools in computer vision and related fields. If all potentials defining the objective are of parametric shape, then in certain cases non-linear optimization is the method of choice for best efficiency. On the other hand, if the potentials are not of a parametric shape, then methods such as loopy belief propagation (BP) or its convex variants are the method of choice. BP and related algorithms face two limitations if the state space is large: first, the intrinsic message passing step requires at least linear time in terms of the state space size, and it is superlinear in general. Thus, the runtime of these methods does not scale well with the state space size. Second, the memory consumption grows linearly with the state space size, since belief propagation requires the maintenance of messages for each state.

If the state space is huge, then even optimizing non-parametric unary potentials (usually referred as data terms) by explicit enumeration may be computationally too expensive for many applications (e.g. when implemented on embedded devices). Certain data terms allow more efficient computation via integral images or running sums, and data terms may need not be computed to full precision, but these methods are only suitable for very specific problem instances.

The present invention seeks to provide improved methods and systems for adjusting an image.

SUMMARY

Aspects and features of an invention are set out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the present disclosure will now be described, by way of example only, with reference to the drawings. In the drawings.

Throughout the description and the drawings, like reference numerals refer to like parts.

DETAILED DESCRIPTION

Figure 1:
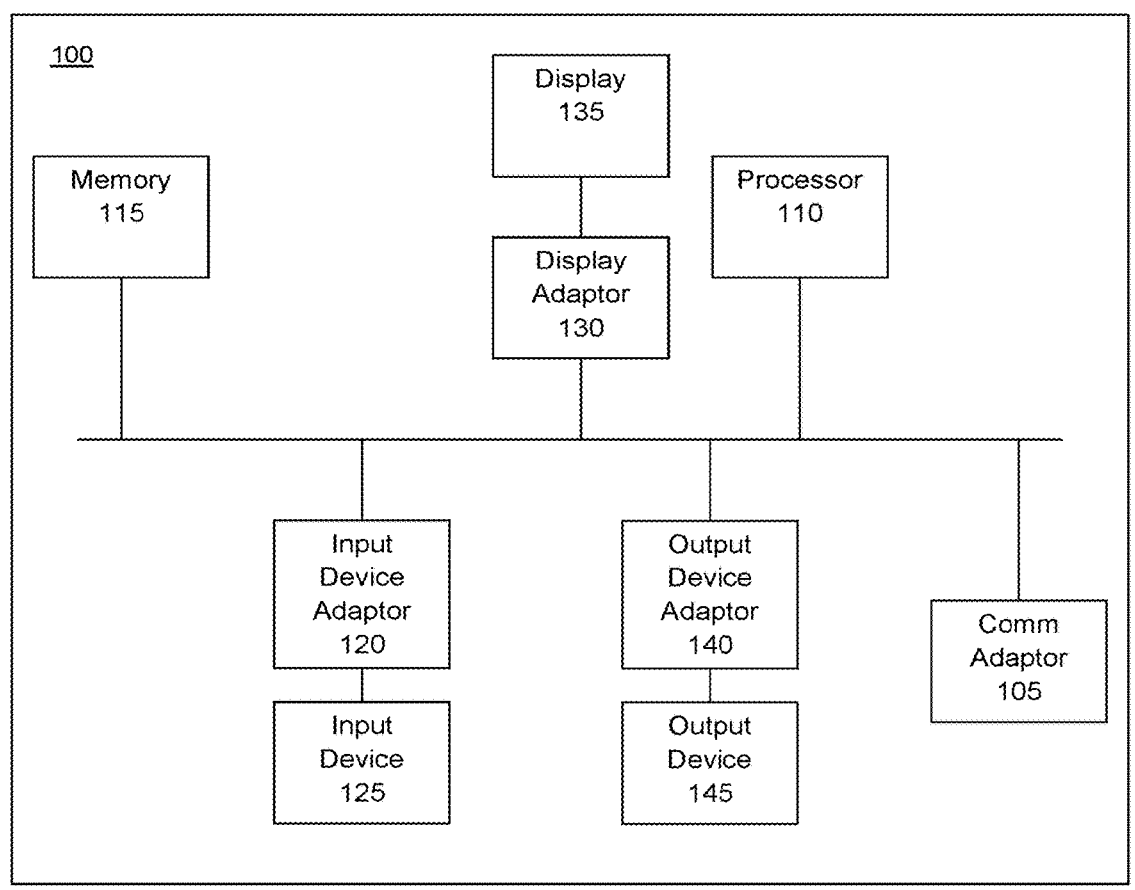
FIG. 1 shows the architecture of an example apparatus or device.

A method for adjusting an image using message passing comprises associating each pixel of an image with a node of a graph and one or more cliques of nodes, determining for a node of the graph a respective set of possible pixel labels for which a unary potential is known, computing for that node a unary potential of a possible pixel label for which the unary potential is unknown, adjusting a clique potential associated with each clique to which that node belongs based on the unary potentials, and adjusting, based on the adjusted clique potential associated with each clique to which that node belongs, at least one of the messages between that node and the other nodes of each clique. Once a convergence criterion is met, an adjusted image is produced having pixel labels determined from the adjusted messages.

A computer implemented method for producing an adjusted image using message passing is provided. The method comprises receiving an input image that comprises a plurality of pixels. Each pixel has an input value and each input value corresponds to one of a number of possible pixel labels. The method further comprises associating each pixel with a node of a graph and one or more cliques of nodes. Each possible pixel label is associated with a unary potential, and, for each permutation of possible pixel labels of the pixels associated with the nodes of each clique, a clique potential is associated. The method further comprises, for each clique, initialising at least one message between each pair of nodes of that clique.

The method further comprises, for each node, a) determining, for that node, a respective set of possible pixel labels for which the unary potential is known, b) computing a unary potential of a selected possible pixel label for which the unary potential is unknown and updating the respective set of possible pixel labels to include the selected possible pixel label, c) for each clique to which that node belongs, based on the unary potentials associated with the updated respective set of possible pixel labels, adjusting the clique potential associated with that clique, and, d) for each clique to which that node belongs, adjusting, based on the adjusted clique potential associated with that clique, at least one of the messages between that node and the other nodes of that clique. For each node, steps a)-d) are repeated until a convergence criterion is met.

The method further comprises producing an adjusted image having pixel labels determined from the adjusted messages.

A unary potential is a mapping from a pair to a real value, the pair comprising a pixel and a label for that pixel. This mapping or function may be based on the image values near the pixel of interest. A unary potential can be thought of as a cost associated with assigning a pixel label or state or value to a pixel (node), A clique potential of a clique is a cost associated with assigning pixel labels or labels to nodes of that clique. Accordingly, in an optimisation problem in image processing, the unary potentials and clique potentials may act as a measure of how close a solution of the problem is to an optimal solution. One may therefore attempt to find an optimal solution by finding a minimum sum of unary potentials and clique potentials, i.e. the assignment of pixel labels to pixels for which there is a minimal cost.

A unary potential may be defined based on the image processing problem to be solved. For example, in some circumstances the unary potentials may all comprise constant values for a respective possible pixel label. In other circumstances, the unary potential may be defined by a polynomial function. Any suitable unary potential may be used and examples will be clear from the examples below.

In some situations, such as when the pixel labels are to be used to identify disparities or flow vectors, the unary potential for a particular pixel is a function comparing an image patch centred at that particular pixel in the reference image with an image patch from a second ("moving") image centred at the particular pixel shifted by the label value.

In some situations, such as when the pixel labels are to be used to identify an object category, the unary potential is a function that has the image patch centred at the particular pixel and an object category as arguments. The unary potential would therefore represent a cost associated with assigning the pixel to an object category. This function can be trained beforehand using, for example, machine learning techniques.

The methods disclosed herein demonstrate a memory-efficient and fast way of performing image processing operations such as object segmentation, distortion correction, blurring and zooming. By calculating a unary potential for a selected possible pixel label in each iteration of steps a) to d), not all of the unary potentials necessarily need to be calculated for the method to converge on a solution to an image processing problem. Accordingly, the method requires less memory to be able to converge on a solution to an image processing problem, while maintaining a high level of accuracy.

The method may further comprise, after step a) and before step c), updating the respective set of possible pixel labels by removing one of the possible pixel labels therefrom. Optionally, for each clique to which the node belongs, the method uses an associated parameter related to messages passed between the node and other nodes of that clique. The parameter can be dependent on the possible pixel labels for that node. The one of the possible pixel labels that is removed from the respective set of possible pixel labels may be the possible pixel label of the respective set of possible pixel labels for which the sum of the associated parameters is greatest.

At step c), adjusting the clique potential associated with that clique may comprise adjusting the clique potential based on a weighted sum of the unary potentials associated with the respective set of possible pixel labels. The weighting may be an even or uneven weighting. Adjusting the clique potential associated with that clique may further comprise adding a constant value to the weighted sum for each possible pixel label which is not included in the respective set of possible pixel labels.

At step b), the selected possible pixel label may be selected from a candidate set of possible pixel labels. The candidate set of possible pixel labels may be based on an estimated set of possible pixel labels of an adjacent node for which the unary potential is known.

Repeating steps a)-d) for each node until a convergence criterion is met may comprise repeating steps a)-d) a predetermined number of times. Repeating steps a)-d) for each node until a convergence criterion is met may comprise repeating steps a)-d) until repetition does not change the messages.

At step b), computing a unary potential of a selected possible pixel label may comprise estimating a unary potential of the selected possible pixel label based on a unary potential associated with a possible pixel label of an adjacent node in the graph. For example, if a possible pixel label of an adjacent node is associated with a particular unary potential (for example a constant value such as 1), then computing the unary potential of the selected possible pixel label may comprise assigning the particular unary potential (the constant value) to the selected possible pixel label. Such an assignment may indicate that adjacent nodes are likely to take the same value, for example by indicating that two adjacent pixels are associated with the same surface depicted in an image.

At step d), adjusting at least one of the messages may comprise adjusting the at least one of the messages according to one or more predetermined message weightings. For example, the messages may be evenly weighted. The messages may be unevenly weighted.

The unary potentials may be configured so as to cause the method to perform a segmentation operation upon the input image. The unary potentials may be configured so as to cause the method to perform a distortion correction operation upon the input image. The unary potentials may be configured so as to cause the method to perform an optical flow operation upon the input image. The unary potentials may be configured so as to cause the method to perform a dense stereo correspondence operation upon the input image. The unary potentials may be configured so as to cause the method to perform an image denoising operation upon the input image. The unary potentials may be configured so as to cause the method to perform a deblurring and/or zooming operation upon the input image. Furthermore the clique potentials may be initially configured so as to cause the method to perform one or more of said operations upon the input image.

An apparatus or system is provided, the apparatus or system arranged to perform a method as disclosed herein. The apparatus or system may comprise input/output means arranged to receive an image. The apparatus or system may comprise a memory storing instructions for causing a processor to perform steps of a method as disclosed herein. The apparatus or system may comprise a processor for performing steps of a method as disclosed herein.

A non-transitory computer-readable medium is provided. The computer-readable medium comprises machine-readable instructions arranged, upon execution by one or more processors, to cause the one or more processors to carry out a method as disclosed herein.

Further optional features will be appreciated from the following description.

FIG. 1 shows the architecture of an example apparatus or device 100 for performing the methods described herein.

The apparatus or device 100 comprises a processor 110, a memory 115, and a display 135. These are connected to an optional central bus structure, the display 135 being connected via a display adaptor 130. The example apparatus or device 100 also comprises an input device 125 (such as a mouse and/or keyboard) and a communications adaptor 105 for connecting the apparatus or device to other apparatuses, devices or networks. The input device 125 and communications adaptor 105 are also connected to the central bus structure, the input device 125 being connected via an input device adaptor 120. The example apparatus or device 100 also comprises an output device 145 (such as a supplementary display device and/or a sound system). The output device 145 is connected to the central bus structure via an output device adaptor 140.

In operation the processor 110 can execute computer-executable instructions stored in the memory 115 and the results of the processing can be displayed to a user on the display 135. User inputs for controlling the operation of the computer may be received via input device(s) 125. Results of at least part of the processing can also be outputted via output device(s) 145.

MAP Inference and Graphical Models

One of the first steps in creating a computer vision system is the establishment of the overall computational paradigm that will be used to compute the final solution. One of the most flexible ways to implement a solution is through the combination of an energy function and maximum a-posteriori (MAP) inference.

The MAP inference strategy begins with the definition of a conditional probability distribution $p(X|Y)$ where $X$ is a vector of random variables estimated from observations $Y$. In MAP inference, the actual estimate $X^*$ is found by finding the vector $X^*$ that maximises $p(X|Y)$.

The connection with energy functions can be seen by expressing $p(X|Y)$ as a Gibbs distribution:

$$p(X|Y) = \frac{1}{Z} \exp\left(-\sum_C E(X_C; Y)\right)$$

where $E(X_C;Y)$ denotes an energy function over a set $X_C$ of elements of $X$. Accordingly, the sum in the exponent is a sum over different sets of elements of $X$. The structure of these sets is characteristic of the model used, as will be discussed below.

The constant $Z$ is a normalisation constant that ensures that $p(X|Y)$ is a valid probability distribution, and accordingly is not usually important for finding $X^*$. Accordingly, it can be seen that to perform MAP inference, one must find the vector $X^*$ which maximises the energy function $$E(X;Y) = \sum_C E(X_C; Y).$$

The next step in MAP inference for image adjustment is to decide what is the form of the distribution $p(X|Y)$ and it is useful to use a graphical model.

A graph G is defined by a pair of sets, $G=(v,\varepsilon)$ with nodes, or vertices, s belonging to the set $v$ of vertices and edges e belonging to the set $\varepsilon$ of edges. Each pixel of a received image may be represented as a node, or vertex, on a graph. Relationships between different pixels of the received image may be represented by edges between nodes on the graph.

Figure 2A:
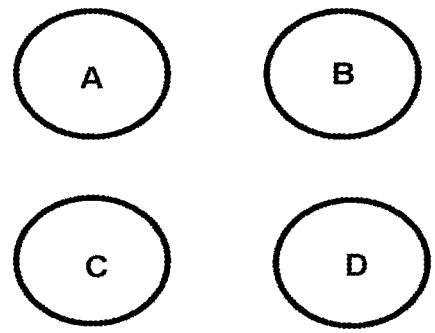
FIGS. 2a, 2b and 2c show example graphs comprising four nodes.

For example, assume that the vector $X$ represents an image comprising 4 pixels, with each pixel able to take on one of 256 values or labels. If one were to specify just $p(X)$ and were to ignore the vector $Y$ describing observations then one would need to determine $256^4$ labels in order to account for every possible interaction between pixels. This is shown in FIG. 2A, which shows a graph comprising four nodes, each node representing a pixel of a received image. In the graph, node A is positioned next to node B and node C is positioned next to node D. Nodes A and B are positioned above nodes C and D respectively. As there are no edges in the graph of FIG. 2A, no interrelationships between pixels are accounted for or modelled.

Figure 2B:
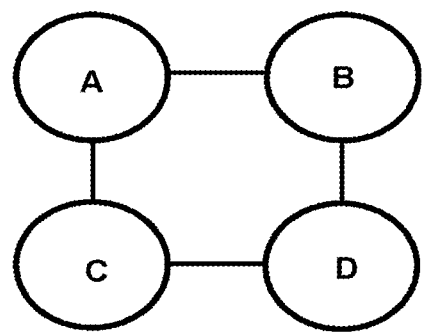

If instead, one was to model some of the interactions between nodes, for example the interactions between horizontal and vertical neighbours, then the number of required labels is reduced. In FIG. 2B, the interactions between node pairs A & B, A & C, C & D, and B & D are modelled and so only $4\times256^2$ labels need be considered to specify the distribution. The reduction in required labels is due to the fact that relationships between diagonal neighbours are captured indirectly by horizontal and vertical neighbours. For example, the interaction between B & C is not specified (there is no edge between nodes B & C on the graph of FIG. 2B) but the interaction between B & C is indirectly capture via the interactions between node pairs A & C and A & B, and node pairs C & D and B & D.

Figure 2C:
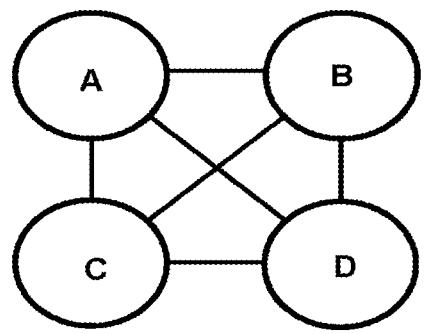

FIG. 2C shows another graph of four pixels A, B, C & D, in which the interactions between all nodes are explicitly modelled by edges. The model in FIG. 2C is more descriptive than the model in 2B.

A clique is a subset of nodes (vertices) of a graph that are completely connected i.e. every distinct node of a clique is adjacent every other distinct node of the clique. For example, in FIG. 2B, node A belongs to a clique comprising nodes A & B as nodes A and B are adjacent. Node A also belongs to a clique comprising nodes A & C as nodes A and C are adjacent. However, in FIG. 2B, there is no clique comprising nodes A & D as nodes A & D are not adjacent they are not connected by an edge.

In FIG. 2C, node A belongs to a clique comprising nodes A & B and a clique comprising nodes A & C. However, in FIG. 2C, node A also belongs to a clique comprising nodes A & D as nodes A & D are adjacent (there is an edge connecting nodes A & D). Additionally, node A belongs to a clique comprising nodes A & B & C, a clique comprising nodes A & B & D, a clique comprising nodes A & C & D, and a clique comprising nodes A & B & C & D.

The cliques loosely capture the direct interactions between nodes. For example, if node A of FIG. 2B is assigned a particular value or label, then such an assignment would have a direct effect on node B and node C. Accordingly, cliques are related to the model used for modelling the computer vision problem.

In view of the above, a labelling or MAP inference problem is determining the optimal label $x_s \in \mathcal{L}_s$ assigned at each node $s \in v_s$ where the objective is over unary terms and clique terms (where cliques are indexed by Greek letters $\alpha$ etc.), $$x^* \stackrel{def}{=} \arg\min_x \sum_s \theta_s(x_s) + \sum_\alpha \theta_\alpha(x_\alpha) \quad \text{(Eq. 1)}$$

where $x=(x_s)_{s\in v} \in \otimes_{s\in v} \mathcal{L}_s$, and $x_\alpha$ and is the subvector of x comprising the labels assigned at nodes belonging to the clique, $x_\alpha=(x_s)_{s\in\alpha}$.

The symbol $\theta_s(x_s)$ represents a unary potential, or cost, associated with assigning the label $x_s$ to the node s. In other words, the potential $\theta_s(x_s)$ is the "energy" associated with assigning the label, or state, $x_s$ to node s. The symbol $\theta_\alpha(x_\alpha)$ represents a clique potential, or cost, associated with assigning particular labels, or states, to the nodes of clique α. In other words, the potential $\theta_\alpha(x_\alpha)$ is the "energy" associated with assigning labels to the nodes of clique α and can be thought of as an energy term associated with interactions between nodes.

The label assignment problem of (Eq. 1) is generally intractable to solve, and one highly successful approach to approximately solve this problem is to employ the corresponding linear programming (LP) relaxation, $$E_{MAP}(b) \overset{def}{=} \sum_{s,x_s} \theta_s(x_s)b_s(x_s) + \sum_{\alpha,x_\alpha} \theta_\alpha(x_\alpha)b_\alpha(x_\alpha) \quad \text{(Eq. 2)}$$

$$\text{s.t.} \quad b_s(x_s) = \sum_{x_\alpha \backslash x_s} b_\alpha(x_\alpha) \quad \sum_{x_s} b_s(x_s) = 1$$

where $E_{MAP}(b)$ is the energy function to be minimised. In (Eq. 2), $b_\alpha(x_\alpha) \geq 0$. The expression $x_\alpha \backslash x_s$ is shorthand for $\{x_\alpha': x_s'=x_s\}$. In what follows $\alpha \ni s$ is written instead of $\{\alpha:s \in \alpha\}$. The unknowns $\{b_s\}_{s \in v}$ and $\{b_\alpha\}_\alpha$ are "one-hot" encodings of the assigned labels, e.g. if b* is the optimal solution of $E_{MAP}$ and the relaxation is tight, then $b_s(x_s)$ is ideally 1 if and only if state $x_s$ is the optimal label at node s and 0 otherwise (similar for clique states $x_\alpha$). The first set of constraints is usually called the set of marginalization constraints, and the unit sum constraint is typically referred as a normalization constraint. The linear program in (Eq. 2) is not unique, since redundant non-negativity and normalization constraints can be added to $E_{MAP}$ without affecting the optimal solution or value. Consequently, different duals are solved in the literature. The particular LP dual of $E_{MAP}$, which will be used in the remainder, is given by $$E_{MAP}^*(\lambda) = \sum_s \rho_s \quad \text{(Eq. 3)}$$

$$\text{s.t.} \quad \forall x_s: \rho_s = \theta_s(x_s) + \sum_{\alpha \ni s} \lambda_{\alpha \to s}(x_s)$$

$$\forall x_\alpha: \sum_{s \in \alpha} \lambda_{\alpha \to s}(x_s) \leq \theta_\alpha(x_\alpha)$$

The first set of constraints will be referred to as the balance constraint and the second set of constraints is termed capacity constraints. Since the unknown $(\rho_s)_{s\in v}$ play only the role of auxiliary variables, they are dropped as argument to $E_{MAP}^*$ to simplify the notation. Without loss of generality one requires $\theta \geq 0$ (pointwise) such that $\lambda=0$ is dual feasible.

Even if (Eq 3) is a convex problem (a linear program), optimizing $E_{MAP}^*$ is not straightforward. Generic LP codes do not exploit the very particular structure of the problem, and first order methods exhibit slow convergence in practice due to the non-smooth objective. A successful class of algorithms to solve $E_{MAP}^*$ approximately is based on block coordinate ascent, which performs repeated optimization over a small but varying subsets of unknowns. Different algorithms are obtained by different choices of dual energies and subsets of optimized unknowns. One important aspect for the success of these algorithms is that the subproblems can be solved efficiently, for example, in closed form. These algorithms usually resemble the classical belief propagation algorithm (which has few guarantees if run on cyclic graphs) and fall under the umbrella term convex belief propagation. These algorithms have in common, that the dual objective improves monotonically in each iteration, which renders them convergent (under the mild assumption that the optimal value of $E_{MAP}^*$ is finite i.e. the problem is bounded).

Dual Coordinate Ascent

In this section a convex belief propagation algorithm is provided which optimizes over all variables $\lambda_{\alpha \to s}$ for all cliques a containing s in each step (i.e. all messages incoming at node s). The convex belief propagation described in this section may be used with any of the methods of adjusting an image using message passing described herein, as will be demonstrated below. It is further shown that this convex belief propagation algorithm is equivalent to optimizing over both incoming and outgoing messages, i.e. block coordinate ascent is performed on a full star-like subgraph. Further, it will be shown that there are additional tuning weights in the algorithm which—depending on the node traversal schedule—have a substantial impact on the observed performance.

If one considers a particular node s and fixes all unknowns other than $\rho_s$ and $\{\lambda_{\alpha \to s}\}_{\alpha \ni s}$, the subproblem induced by (Eq. 3) reads as $$\max_{\rho_s, \{\lambda_{\alpha \to s}\}} \rho_s \quad \text{s.t.} \quad \rho_s = \theta_s(x_s) + \sum_{\alpha \ni s} \lambda_{\alpha \to s}(x_s) \quad \text{(Eq. 4)}$$

$$\lambda_{\alpha \to s}(x_s) \leq \min_{x_\alpha \backslash x_s} \left\{ \theta_\alpha(x_\alpha) - \sum_{t \in \alpha \backslash s} \lambda_{\alpha \to t}(x_t) \right\}$$

The right hand side of the inequality constraints are defined as $\mu_{\alpha \to s}(x_s)$, $$\mu_{\alpha \to s}(x_s) \overset{def}{=} \min_{x_\alpha \backslash x_s} \left\{ \theta_\alpha(x_\alpha) - \sum_{t \in \alpha \backslash s} \lambda_{\alpha \to t}(x_t) \right\}. \quad \text{(Eq. 5)}$$

Non-negative weights $w_{\alpha \to s}$ are introduced such that $\sum_{\alpha \ni s} w_{\alpha \to s}=1$ but otherwise chosen arbitrarily) and the ansatz $\lambda_{\alpha \to s}(x_s)=\mu_{\alpha \to s}(x_s)-w_{\alpha \to s}\delta_s(x_s)$ is used for some $\delta_s(x_s) \geq 0$ to obtain the equivalent problem to (Eq. 4), $$\max_{\rho_s, \delta_s \geq 0} \rho_s \quad \text{s.t.} \quad \rho_s = \theta_s(x_s) + \sum_{\alpha \ni s} \mu_{\alpha \to s}(x_s) - \delta_s(x_s) \quad \text{(Eq. 6)}$$

The choice of these weights and their impact on the convergence rate will be discussed later in this section. Since $\delta_s(x_s) \geq 0$, the largest allowed value for $\rho_s$ is given by $$\rho_s \leftarrow \underbrace{\min_{x_s} \left\{ \theta_s(x_s) + \sum_{\alpha \ni s} \mu_{\alpha \to s}(x_s) \right\}}_{\overset{def}{=} \nu_s(x_s)} \quad \text{(Eq. 7)}$$

and $\delta_s(x_s)$ and $\lambda_{\alpha \to s}$ are consequently given by $$\delta_s(x_s) \leftarrow \theta_s(x_s) + \sum_{\alpha \ni s} \mu_{\alpha \to s}(x_s) - \rho_s = \nu_s(x_s) - \rho_s(x_s)$$

$$\lambda_{\alpha \to s} \leftarrow \mu_{\alpha \to s}(x_s) - \omega_{\alpha \to s} \delta_s(x_s).$$

Via complementary slackness it is easy to see that if is dual optimal, then $\nu_s(x_s) > \rho_s$ implies $b_s(x_s) = 0$ in the primal solution of $E_{MAP}$. Algorithm 1 summarizes this convex BP method.

---

Algorithm 1
Node-based message passing

---

Require: Aibitrary feasible $\lambda$ and $\rho$, weights $w_{\alpha \to s}$
1:  while not converged do
2:    loop over $s \in V$ and assign for all $\alpha \ni s$
3:    Node update:

$$\mu_{\alpha \to s}(x_s) \leftarrow \min_{x_\alpha \setminus x_s} \left\{ \theta_\alpha(x_\alpha) - \sum_{t \in \alpha \setminus s} \lambda_{\alpha \to t}(x_t) \right\}$$

$$\rho_s \leftarrow \min_{x_s} \left\{ \theta_s(x_s) + \sum_{\alpha \ni s} \mu_{\alpha \to s}(x_s) \right\}$$

$$\delta_s(x_s) \leftarrow \theta_s(x_s) + \sum_{\alpha \ni s} \mu_{\alpha \to s}(x_s) - \rho_s$$

$$\lambda_{\alpha \to s} \leftarrow \mu_{\alpha \to s}(x_s) - w_{\alpha \to s} \delta_s(x_s)$$

4:  end loop
5:  end while

---

Before discussing the impact of the choice of weights $w_{\alpha \to s}$, the following is stated:

Result 1.

Algorithm 1 is equivalent to performing dual coordinate ascent with respect to both incoming messages $\lambda_{\alpha \to s}$ and reverse messages $\lambda_{\alpha \to t}$, $t \in \alpha \setminus s$. This means that for a fixed node s messages $\lambda_{\alpha \to t}$ are updated for all cliques a containing s.

Proof of Result 1:

Update $\lambda_{\alpha \to s}$ and for $\lambda_{\alpha \to t}$ for a node s and its neighbouring node t (i.e. nodes sharing a clique with s). Thus, maximise $$\max_{\rho_s, \{\rho_t\}, \{\lambda_{\alpha \to t}\}_{\alpha \ni s}} \rho_s + \sum_t \rho_t$$

s.t. $\rho_s = \theta_s(x_s) + \sum_t \lambda_{\alpha \to s}(x_s)$ $\rho_t = \tilde{\theta}_t(x_t) + \lambda_{\alpha \to t}(x_t) \ \forall \ t \neq s$ $$\sum_{r \in \alpha} \lambda_{\alpha \to r}(x_r) \leq \theta_\alpha(x_\alpha),$$

where $\bar{\theta}_t(x_t)$ is the reparametrized unary potential, $\bar{\theta}_t(x_t) \stackrel{def}{=} \theta_t(x_t) + \Sigma_{\beta \neq \alpha} \lambda_{\beta \to t}(x_t)$. Observe that one can replace each $\rho_t$ by $\rho_t - \varepsilon_t$ (for all $t \in \alpha \setminus s$), and substitute $\rho^s$ with $\rho_s + \Sigma_t \varepsilon_t$ (and setting $\text{and } \lambda_{\alpha \to s} \leftarrow \lambda_{\alpha \to s} + \Sigma_{t \in \alpha \setminus s} \varepsilon_t$ and $\lambda_{\alpha \to t} \leftarrow \lambda_{\alpha \to t} + \varepsilon_t$) without changing the objective (or violating constraints). Thus, it is possible to assume that $\rho_t = 0$ without loss of generality, and $\lambda_{\alpha \to t}(x_t) = -\tilde{\theta}_t(x_t)$. Plugging this into the maximization problem yields $$\max_{\rho_s, \{\lambda_{\alpha \to s}\}} \rho_s \text{ s.t. } \rho_s = \theta_s(x_s) + \sum_{\alpha \ni s} \lambda_{\alpha \to s}(x_s)$$

$$\lambda_{\alpha \to s}(x_s) \leq \theta_\alpha(x_\alpha) + \sum_{t \in \alpha \setminus s} \tilde{\theta}_t(x_t),$$

This variant of dual coordinate ascent is not stronger than optimizing solely over incoming messages $\lambda_{\alpha \to s}$. As one has the freedom to arbitrarily assign values to all $\rho_t$, the values $\rho_t$ can be kept constant, i.e. one does not need to maximize with respect to $\rho_t$ at all. In this case $\lambda_{\alpha \to t}$ is fixed to its old value (which follows from $\rho_t = \theta_t(x_t) + \lambda_{\alpha \to t}(x_t)$) and maximization is performed only with respect to and $\lambda_{\alpha \to s}$ thus optimizing with respect to both messages is equivalent to the original method in Algorithm 1.

The block coordinate method in Algorithm 1 optimizes over fewer unknowns than, for example, the tree block-coordinate one, updates a larger set of unknowns than min-sum-diffusion or MPLP.

Stable Points:

Recall that a block-coordinate method applied on a (not strictly) convex (or concave) problem is only guaranteed to monotonically improve the objective but does not necessarily achieve one optimal solution as its fixed point. Convergence to a fixed point follows from monotonicity. Reasoning about fixed points is actually too restrictive, since the dual objective $\Sigma_s \rho_s$ will usually remain constant long before $\lambda$ reaches a fixed point. Hence we relax the fixed point condition and will introduce stable points shortly. Another slight complication arises from the fact, that the assignment of contributions $\rho_s$ to the dual objective value $v^* = \Sigma_s \rho_s$ is not unique: one can arbitrarily shift quantities between nodes by adjusting the messages without changing the objective or active constraints (i.e. without changing the primal solution). Fortunately, this ambiguity is fixed by updating only $\rho_s$ for a single node in each node update step in Algorithm 1 (i.e. the freedom to modify $\rho_t$ at neighbouring nodes t is not used), and one can define stable points:

Definition 1.

$\lambda$ is called a stable point for $E_{MAP}^*(\cdot | \theta)$ if the following condition is met:

$$\forall s: \exists x_s: \forall \alpha \ni s: \lambda_{\alpha \to s}(x_s) = \mu_{\alpha \to s}(x_s) \qquad \text{(Eq. 8)}$$

(using the definition of $\mu_{\alpha \to s}(x_s)$ as in (Eq. 5)).

In other words, $\lambda$ is stable if for all nodes there exists a state with all capacity constraints being active. In some sense stable points are fixed points for node updates:

Result 2.

If $\lambda$ is a stable point, running Algorithm 1 (with any traversal schedule for nodes) will not improve the dual objective $E_{MAP}^*(\cdot | \theta)$.

Before sketching the proof, the notion of active states is introduced:

Definition 2.

Let potentials $\theta$ and messages $\lambda$ be given. Using the notation as in Algorithm 1, a state $x_s$ is called active, if $\nu_s(x_s) = \min_{x'_s} \nu_s(x'_s) = \rho_s$.

A state $x_s$ being active at node s means that all capacity constraints are active for cliques a containing s, thus $\Sigma_{t \in \alpha} \lambda_{\alpha \to t}(x_t) = \theta_\alpha(x_\alpha)$. If $w_{\alpha \to s} > 0$, i.e. the weights are chosen from the interior of the unit simplex, the converse is also true.

Result 2 can be seen as follows: a node update at s (Algorithm 1) can only improve the value of $\rho_s$, if at least one capacity constraint for a clique $\alpha \ni s$ becomes inactive for every previously active state. If this is not the case, then $\rho_s = \Sigma_{\alpha \ni s} \pi_{\alpha \to s}(x_s)$ also remains constant, and it is easy to see that then $\lambda_{\alpha \to s}(x_s)$ also remains constant for active states. Messages may change for inactive states.

Figure 3:
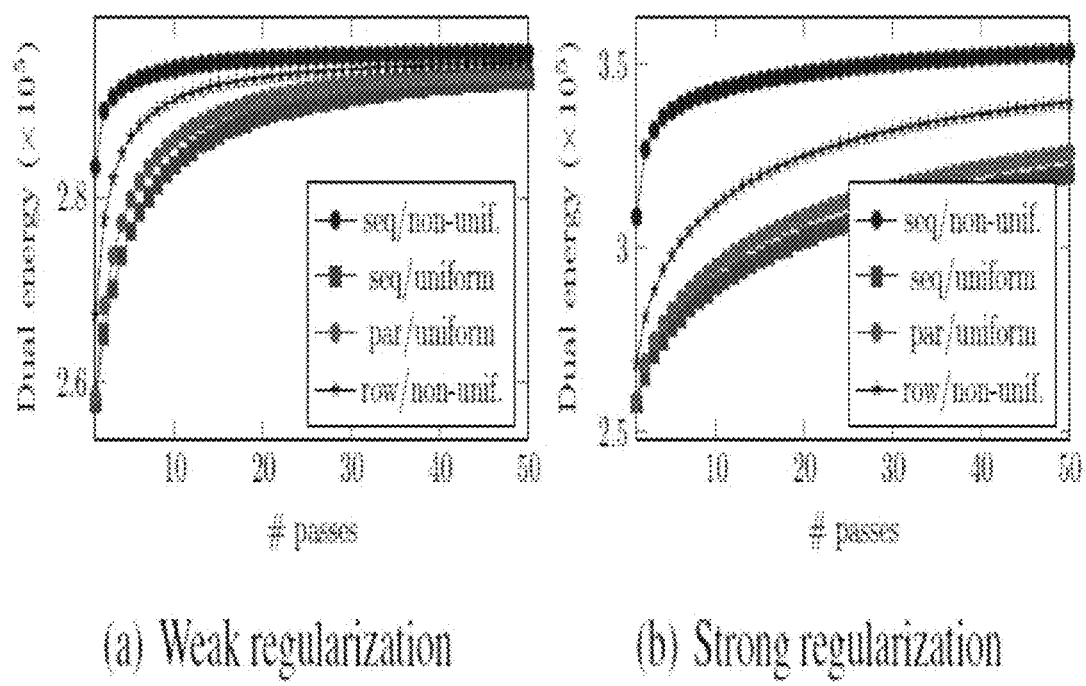
FIG. 3 shows the evolution of dual energies with respect to the number of passes of the image for a dense stereo correspondence problem.

Traversal Schedule and Choice of Weights:

The scheduling policy in which order the nodes $s \in v$ are traversed and the exact choice of $w_{\alpha \to s}$ are unspecified parameters of the algorithm. Intuitively, different choices for the node traversal schedule and weights may be beneficial for the speed of convergence, since relevant message information may be propagated faster depending on the schedule and employed weights. A non-uniform weighting assigning larger weights to forward (hyper-)edges, means that messages incoming at successor nodes t will have larger upper bounds $\mu_{\alpha \to t}$ and the subproblem (Eq. 4) at node t is therefore less constrained. In FIG. 3 the evolution of dual energies with respect to the number of passes of the image for a dense stereo correspondence problem is illustrated. "Seq" refers to a schedule, that alternates between sequential top-to-bottom, left-to-right traversal (and its reverse), "par" is the schedule of (possibly simultaneously) updating every other pixel in the image, and "row" refers to a row-parallel schedule that simultaneously traverses every other row in the image and reverses the direction after every pass. We show results for uniform and non-uniform weight assignments. The combination "seq/non-uniform" has the fastest convergence speed if run on a sequential processor. Since the policy "row/non-uniform" is suitable for parallel implementation, we use this policy in our experiments.

Figure 4A:
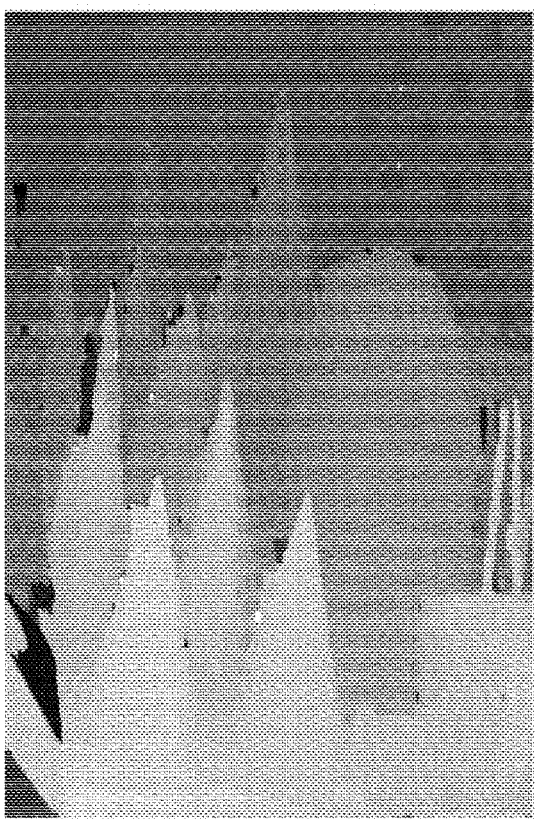
FIGS. 4a and 4b show converged disparity maps.
Figure 4B:
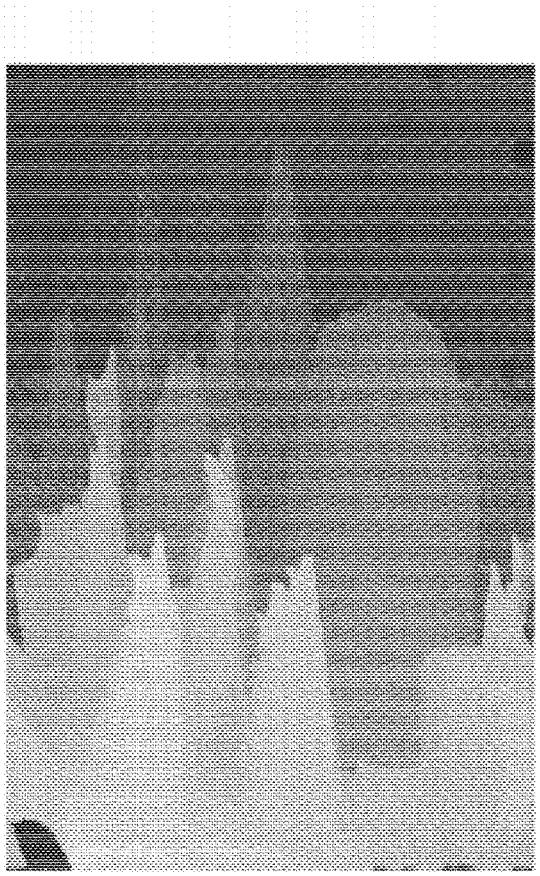

The higher resolution stereo pair of the "Cones" dataset is used to generate the graph in FIG. 3. The unary potentials are NCC-induced costs, $$\frac{1}{\tau} \min\left\{\tau, \frac{1 - ZNCC}{2}\right\}$$

with $\tau=0.5$ and the NCC score computed on a 5×5 grayscale patch. ZNCC is the zero-mean NCC of 5×5 gray-scale images patches. The $P_1$-$P_2$ smoothness model is used. For the "weak regularization" setting P1=¼, P2=1 was chosen and FIG. 4A shows the converged result. To obtain strong regularization P1=1, P2=4 were chosen and FIG. 4(b) shows the converged result.

The meaning of the traversal schedules is as follows:
Seq: sequential scan from top-left pixel to bottom-right one (for odd passes) and its reverse (for even passes).
Row: Sequential scan from left to right for odd rows first, then even ones. The direction is reversed to right-to-left in every other pass.
Par: update white pixels in a checkerboard pattern first, then black ones.

The weights are assigned according to the following:
Uniform weighting: all $w_{\alpha \to s}$ are set to 1/deg(s).
Non-uniform weighting: $w_{\alpha \to s}$ is set to=1/32 for backward edges in the traversal schedule. For the "seq" schedule, forward edges have weight $w_{\alpha \to s}=\frac{1}{2}-\varepsilon$, such that the total sum of weights is 1. In the "row" schedule, edges to pixels in the previous and next row have weight ¼, and therefore the forward edge has weight 1−2×¼−=½−ε.

Lazy Evaluation and Pessimistic Potentials

In this section it is assumed that the potentials are not given in advance for each state and need to be computed on demand. One strategy is to utilize a proxy for not-yet queried potentials, and to determine the states considered promising for subsequent queries while performing inference. Thus, reparametrized costs arising in the inference procedure can guide the exploration of true values for the respective potentials. It will be shown that using an upper bound for not queried potentials, i.e. "pessimistic" potentials, is highly beneficial in this context.

This section provides the necessary background and focuses on "lazy evaluation" of computationally costly unary potentials, but the inference algorithm keeps the full representation of messages. In the next section it is described how delayed evaluation of clique potentials yields compressed message representations, and how it enables more efficient inference.

Pessimistic Potentials:

Let θ be the true but only partially known potentials, and pessimistic upper bound potentials $\bar{\theta} \geq \theta$ (point-wise) are available. By construction we have $$\min_\lambda E^*_{MAP}(\lambda \mid \theta) \leq \min_\lambda E^*_{MAP}(\lambda \mid \bar{\theta}). \quad \text{(Eq. 9)}$$

Definition 3.

For given potentials θ let $\vartheta$ be a reparametrization of θ such that $\vartheta_s(x_s)=0$ for all s and $x_s$. Without loss of generality we set $$\hat{v}_\alpha(x_\alpha) \leftarrow \theta_\alpha(x_\alpha) + \sum_{s \in \alpha} \frac{\theta_s(x_s)}{deg(s)} \quad \vartheta_s(x_s) \leftarrow 0. \quad \text{(Eq. 10)}$$

Instead of reasoning about stable points of $E_{MAP}^*(\cdot \mid \theta)$ it is beneficial to work with $E_{MAP}^*(\cdot \mid \vartheta)$ since modifying potentials $\vartheta$ will only affect the capacity constraints but not the balance conditions. For clarity, $E_{MAP}^*(\cdot \mid \vartheta)$ is here restated:

$$E^*_{MAP}(\lambda \mid \vartheta) = \sum_s \rho_s \text{ s.t. } \rho_s = \sum_{\alpha \ni s} \lambda_{\alpha \to s}(x_s) \quad \text{(Eq. 11)}$$

$$\sum_{s \in \alpha} \lambda_{\alpha \to s}(x_s) \leq \vartheta_\alpha(x_\alpha) \left(= \theta_\alpha(x_\alpha) + \sum_{s \in \alpha} \frac{\theta_s(x_s)}{deg(s)}\right)$$

This correspondence also carries over to attributed potentials such as $\bar{\theta} \leftrightarrow \bar{\vartheta}$ etc. For these reparametrized potentials it is clear that if λ is feasible for $E_{MAP}^*(\cdot \mid \vartheta)$, then it is also feasible for $E_{MAP}^*(\cdot \mid \bar{\vartheta})$. The interesting question is the following: when are stable points λ for $E_{MAP}^*(\cdot \mid \bar{\vartheta})$ also stable points for $E_{MAP}^*(\cdot \mid \vartheta)$?

Result 3.

Let λ be a stable point for $E_{MAP}^*(\cdot \mid \bar{\vartheta})$. If $\bar{\lambda}$ is feasible for $E_{MAP}^*(\cdot \mid \vartheta)$ then $\bar{\lambda}$ is also a stable point for $E_{MAP}^*(\cdot \mid \vartheta)$.

Proof.

Let be a stable point for $E_{MAP}^*(\cdot \mid \bar{\vartheta})$ and feasible with respect to $(\cdot \mid \vartheta)$. Fix a node s. The essential quantities in Algorithm 1 applied on $\bar{\lambda}$ are $$\bar{\mu}_{\alpha \to s}(x_s) \stackrel{def}{=} \min_{x_\alpha \backslash x_s}\left\{\bar{\vartheta}_\alpha(x_\alpha) - \sum_{t \in \alpha \backslash s} \bar{\lambda}_{\alpha \to t}(x_t)\right\} \quad \text{(Eq. 12)}$$

$$\bar{v}_s(x_s) \stackrel{def}{=} \sum_{\alpha \ni s} \bar{\mu}_{\alpha \to s}(x_s).$$

Since $\bar{\lambda}$ is a fixed point for $\vartheta$ have $$\sum_{\alpha} \bar{\lambda}_{\alpha \to s}(x_s) = \bar{\rho}_s = \min_{x'_s} \bar{v}_s(x'_s). \quad \text{(Eq. 13)}$$

Updating the messages incoming at s now with respect to the potential $\vartheta$ require computation of $$\mu_{\alpha \to s}(x_s) \leftarrow \min_{x_\alpha \setminus x_s} \left\{ \vartheta_\alpha(x_\alpha) - \sum_{t \in \alpha \setminus s} \bar{\lambda}_{\alpha \to t}(x_t) \right\} \quad \text{(Eq. 14)}$$

$$v_s(x_s) \leftarrow \sum_{\alpha \ni s} \mu_{\alpha \to s}(x_s)$$

and $\rho_s \leftarrow \min_{x_s} v_s(x_s)$. By construction we have $\mu_{\alpha \to s}(x_s) \leq \bar{\mu}_{\alpha \to s}(x_s)$, $v_s(x_s) \leq \bar{v}_s(x_2)$, and $\rho_s \leq \bar{\rho}_s$. But since $\lambda$ is feasible with respect to $\vartheta$ it is known that $$\bar{\lambda}_{\alpha \to s}(x_s) \leq \vartheta_\alpha(x_\alpha) - \sum_{t \in \alpha \setminus s} \bar{\lambda}_{\alpha \to t}(x_t) \quad \text{(Eq. 15)}$$

i.e. $\bar{\lambda}_{\alpha \to s}(x_s) \leq \mu_{\alpha \to s}(x_s)$. This implies that $$\bar{\rho}_s = \sum_{\alpha \ni s} \bar{\lambda}_{\alpha \to s}(x_s) \leq \min_{x'_s} \left\{ \sum_{\alpha \ni s} \mu_{\alpha \to s}(x'_s) \right\} = \rho_s \quad \text{(Eq. 16)}$$

and therefore $\bar{\rho} = \rho_s$. Thus, the objective does not improve by updating the messages incoming at s. Further, for active states $x_s$ (w.r.t. $\bar{\lambda}$) one has $\bar{\lambda}_{\alpha \to s}(x_s) = \bar{\mu}_{\alpha \to s}(x_s)$ (since the capacity constraints are active for active states), and combining this with $\bar{\lambda}_{\alpha \to s}(x_s) \leq \mu_{\alpha \to s}(x_s)$ and $\mu_{\alpha \to s}(x_s) \leq \bar{\mu}_{\alpha \to s}(x_s)$ one obtains $$\bar{\mu}_{\alpha \to s}(x_s) = \mu_{\alpha \to s}(x_s) \quad \text{(Eq. 17)}$$

Hence, for active states $\delta_s(x_s) = 0$ and the updated messages $\lambda_{\alpha \to s}(x_s)$ for these states are given by $$\lambda_{\alpha \to s}(x_s) \leftarrow \mu_{\alpha \to s}(x_s) = \bar{\mu}_{\alpha \to s}(x_s) = \bar{\lambda}_{\alpha \to s}(x_s) \quad \text{(Eq. 18)}$$

and $\bar{\lambda}$ a stable point for $E_{MAP}^*(\cdot | \vartheta)$.

The relevance of this result in our setting is the following: given upper bounds on the true potentials, one can interleave sampling (or exploration) of their true value with MAP inference via successive node updates (or exploitation in a wider sense), and in the limit that combined exploration exploitation strategy still leads to a stable point of the full inference problem. It also tells—given current messages $\lambda$—which states are good candidates to query the respective true potential: they are the ones that are more likely to violate the corresponding capacity constraint.

Lazy Evaluation of Unary Potentials:

The typical setting is that the unary potentials are non-parametric and costly to evaluate data terms, and that clique potentials (usually pairwise ones) are parametric and inexpensive to compute. Hence for the purposes of the present embodiment, one is interested in an approach that leads to "guided" evaluation of unseen data terms, which are then used in subsequent node updates.

In the following we will assume that the unary potentials are bounded from above, e.g. $_s x_s \theta_s(x_s) \leq 1$. The upper bound may be dependent on but for simplicity assume a constant upper bound. Partial knowledge of (unary) potentials combined with an upper bound on the unknown ones leads to related MAP inference problem:

Definition 4.

For each $s \in v$ let L(s) be the set of resident states for which the true unary potentials are known, and $\hat{\theta}$ is constructed as follows:

$$\hat{\theta}_s(x_s) = \begin{cases} \theta_s(x_s) & \text{if } x_s \in L(s) \\ 1 & \text{otherwise.} \end{cases} \quad \text{(Eq. 19)}$$

and $\hat{\theta}_\alpha(x_\alpha) = \theta_\alpha(x_\alpha)$.

Note that for $\hat{\theta}$ there are corresponding reparametrized potentials $\hat{\vartheta}$ with vanishing unary potentials (recall Def. 3). With these definitions it is possible to present a meta-algorithm for MAP inference with lazy evaluation of data terms in Algorithm 2:

---

Algorithm 2 Limited memory PM-CBP.

---

Require: Number of passes T, initial cardinality |L(s)|
Require: Weights $w_{\alpha \to s}$
  1: Initialize L(s) for all s (e.g. randomly)
  2: $\forall s : L(s) \leftarrow L(s) \cup *$
  3: Compute initial $\hat{\theta}$, initialize all messages $\lambda$ with 0
  4: for k = 1 . . . T do
  5:   loop over s ∈ V
  6:     Find least active state $x_s^-$
  7:     L(s) ← L(s) \ $x_s^-$, drop $\theta_s(x_s^-)$ from $\hat{\theta}$
  8:     Find potentially violating state $x_s^+$
  9:     L(s) ← L(s) ∪ $x_s^+$, add $\theta_s(x_s^+)$ to $\hat{\theta}$
 10:     Apply node update w.r.t $\hat{v}$
 11:   end loop
 12: end for
 13: Optional: run Alg. 1 to roach a stable point $\lambda$

---

Note:
The framed instruction only apply to the limited memory variant discussed in the section entitled "Limited-memory PM-CBP".

The same remarks on the node traversal schedule and choice of weights $w_{\alpha \to s}$ as for Algorithm 1 apply. In the limit $T \to \infty$ every state is explored in algorithm, and a stable point for the full MAP inference problem is obtained. The algorithm may also stop earlier if no violating state is found at any of the nodes. The most relevant application will be when T is a constant value to meet, for example, a runtime budget. This leads to the main open design choice in the algorithm: how to find a state $x_s$ such that instantiating $\theta_s(x_s)$ leads to the largest subsequent reduction in the objective. In order to describe the principle, we assume for now that all states are considered at pixel s. In practice neighbouring pixels are utilized to generate a small set of candidate states, which will be described in the section entitled "Limited-memory PM-CBP" below. The selected possible pixel label, $x_s^+$ for which the unary potential is to be calculated may therefore be selected from a candidate set of possible pixel labels, wherein the candidate set of possible pixel labels is based on an estimated set of possible pixel labels of an adjacent node for which the unary potential is known. In this example, the state $x_s^+$ to evaluate the unary potential for is determined as the state with the smallest value of $v_s(x_s)$ by using an estimated cost) $\tilde{\theta}s(x_s)$ in the place of the unknown $\theta_s(x_s)$, i.e. $x_s^+$ is set to $$\arg\min_{x_s \notin L(s)} \sum_{\alpha \ni s} \min_{x_\alpha \setminus x_s} \left\{ \bar{\vartheta}_\alpha(x_\alpha) - \sum_{t \in \alpha \setminus s} \lambda_{\alpha \to t}(x_t) \right\}, \quad \text{(Eq. 20)}$$

where $\tilde{\vartheta}$ is obtained from $\hat{\vartheta}$ by substituting $\hat{\theta}_s(x_s)$ with $\tilde{\theta}_s(x_s)$. Note that $\tilde{\theta}_s(x_s)$ should be the true data term $\theta_s(x_s)$ or a lower bound thereof for Result 3 to hold, In practice it is possible to use the smallest unary potential from the neighbours as the estimate. i.e. $\tilde{\theta}_s(x_s) \leftarrow \min_{t \in N(s)} \hat{\theta}_t(x_t)$, which appears to work well. Overall, determining $x_s^+$ according to (Eq. 20) essentially amounts to performing one node update step of Algorithm 1 and has the same runtime complexity.

Figure 5:
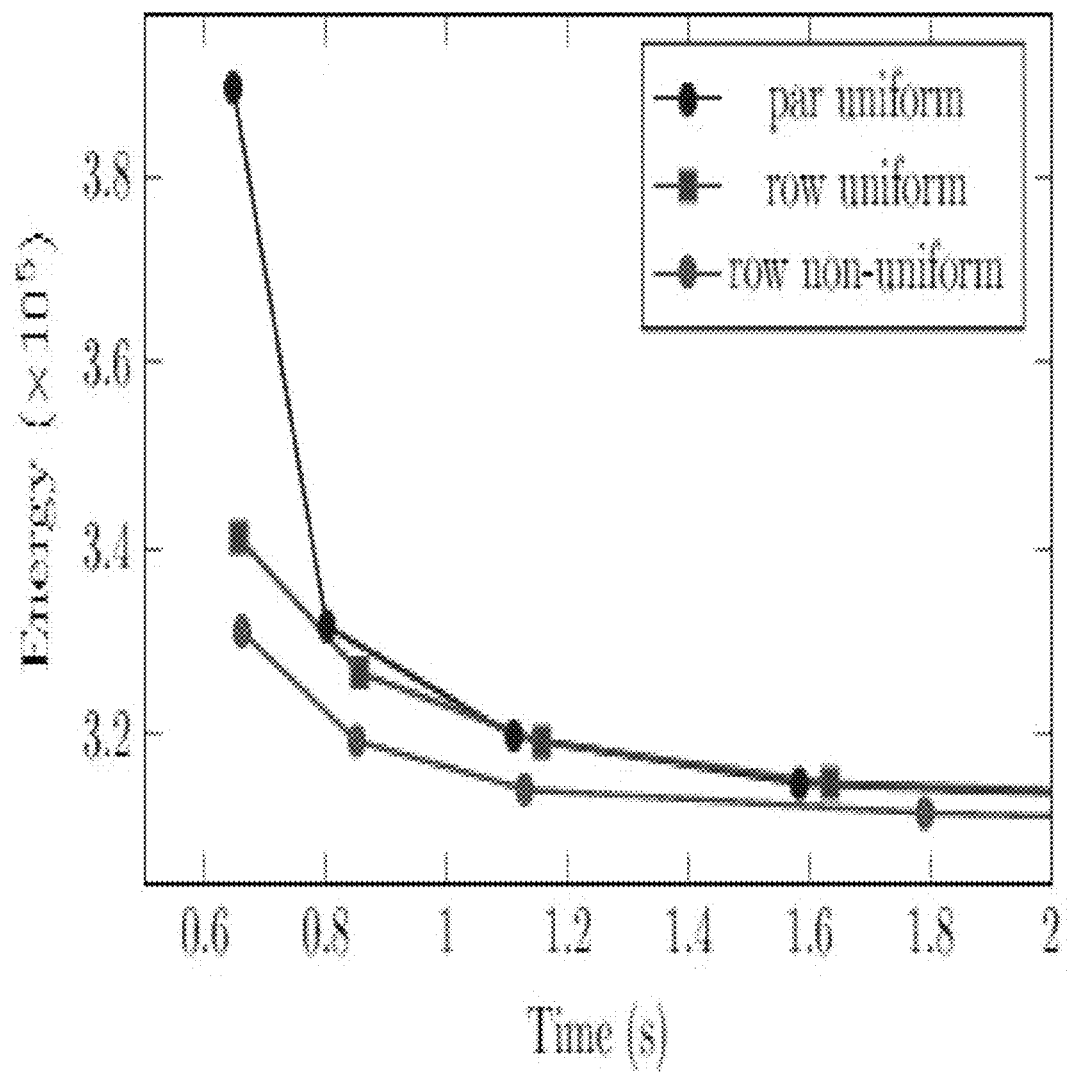
FIG. 5 is a graphical plot showing the primal energy evolution with respect to number of passes over an image using different traversal schedules and weights according to a method disclosed herein.

While above it was shown that the schedule and the weights influence the convergence speed for standard convex BP, PM-CBP benefits as well especially if the algorithm is run for a few passes. FIG. 5 shows that the "row+non-uniform" setting achieves a lower primal energy much quicker than schedules using a uniform weighting.

Figure 6:
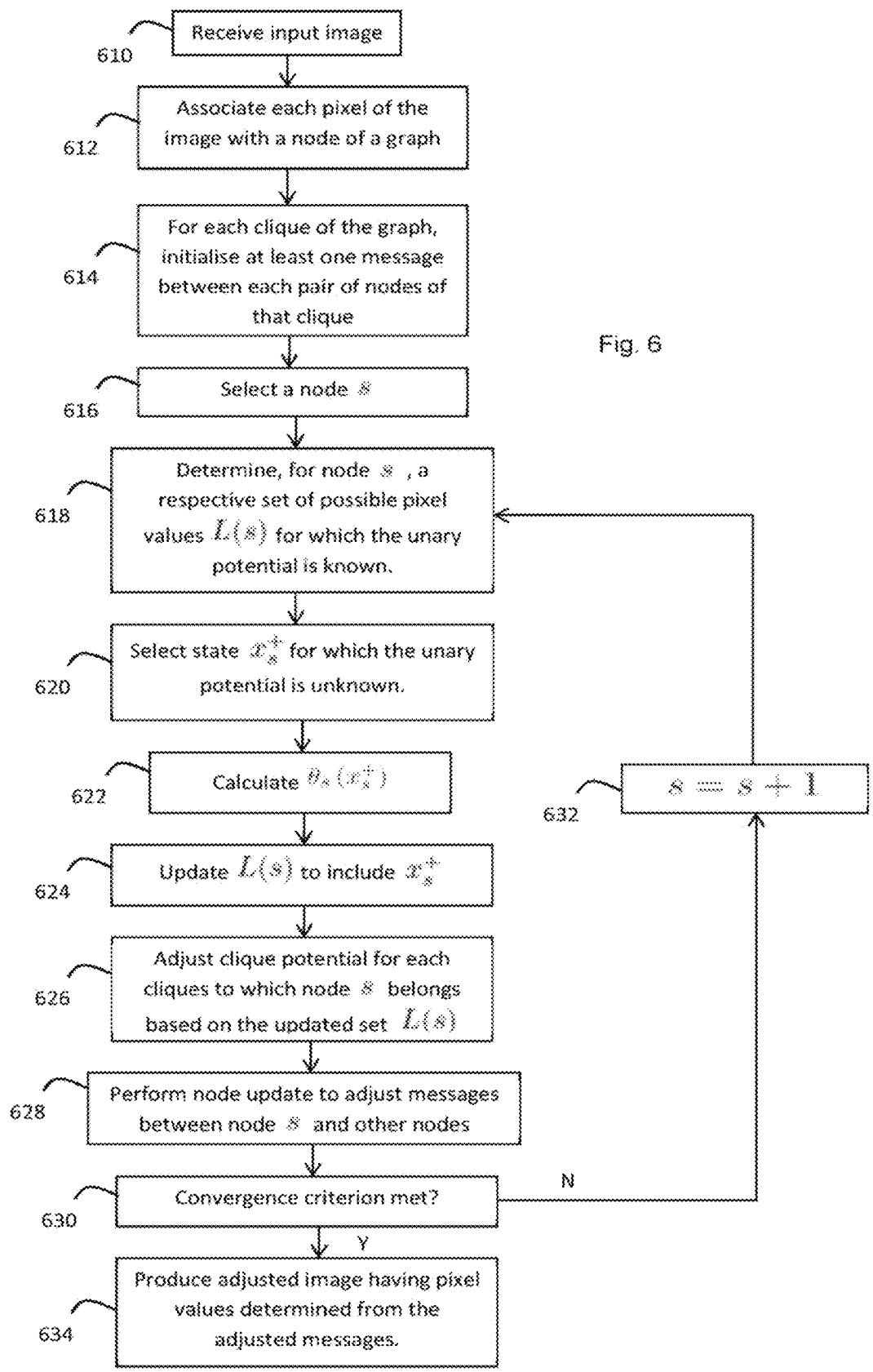
FIG. 6 is a flowchart illustrating a method of adjusting an image.

FIG. 6 is a flowchart showing a computer implemented method for adjusting an image using message passing. The method may be performed by, for example, the architecture described above in relation to FIG. 1. At step 610 an input image is received. The input image comprises a plurality of pixels, each pixel having an input value and each input value corresponding to one of a number of possible pixel labels or states.

At step 612, each pixel of the input image is associated with a node of a graph and one or more cliques of nodes. Each possible pixel label is associated with a unary potential and, for each permutation of possible pixel labels of the pixels associated with the nodes of each clique, a clique potential is associated.

At step 614, for each clique of the graph, at least one message between each pair of nodes of that clique is initialised. For example, as with Algorithm 2 described above, all messages λ are initialised to 0.

At step 616, a node s is selected according to a node traversal scheduling policy. For example, the node traversal scheduling policy may indicate that nodes of the graph are to be traversed sequentially in the same order each time.

At step 618, for that node a respective set of possible pixel labels for which the unary potential is known is determined. In other words, for that node the set of resident states L(s) is determined. An array $\hat{\theta}_s(x_s)$ may then be defined accordingly (see (Eq. 19)).

At step 620 a state $x_s^+$ is selected, the state $x_s^+$ not belonging to the respective set of possible pixel labels for which the unary potential is known. As described above, the state $x_s^+$ may be selected based on a determination of the state with the smallest value of $v_s(x_s)$ by using an estimated cost $\tilde{\theta}_s(x_s)$.

At step 622, the unary potential of the selected possible pixel label is calculated.

At step 624, the respective set L(s) of possible pixel labels for which the unary potential is known is updated to include the selected state $x_s^+$. The array $\hat{\theta}_s(x_s)$ may be updated accordingly.

At step 626, for each clique to which node s belongs, the clique potential associated with that clique is adjusted or reparameterised based on the updated respective set of possible pixel labels L(s). For example, the clique potentials are adjusted as in (Eq. 10), which also shows the unary potentials being adjusted to zero.

At step 628, a node update is performed according to Algorithm 1, using the adjusted clique potentials. This has the effect of, for each clique to which the node s belongs, adjusting, based on the adjusted clique potential associated with that clique, at least one of the messages between nodes and the other nodes of that clique.

At step 630, a determination is made as to whether or not a convergence criterion has been met. If the convergence criterion has not been met, the method proceeds to step 632, in which a different node is selected according to the node traversal scheduling policy. The method then returns to step 618. The convergence criterion may be, for example, that a solution to the dual problem of (Eq. 11) has been found. The convergence criterion may be, for example, that the method has traversed over all nodes a predetermined number of times.

If, at step 630, a determination is made that the convergence criterion has been met, then the method proceeds to step 634 and an adjusted image is produced having pixel labels determined from the adjusted messages. If, for example, the convergence criterion is that a solution to the dual problem of (Eq. 11) has been found, then the adjusted image may be produced by translating the solution to a solution of a corresponding primal problem and assigning the labels to the pixels accordingly.

Limited-Memory PM-CBP

The main benefit of the basic PM-CBP algorithm is only apparent when early stopping is applied: in this case only a subset of unary potentials is evaluated, and the final convex BP iterations converge to the solution of a proxy MAP instance with partially pessimistic potentials. Runtime savings come from not evaluating all data terms (which can lead to substantial savings). Interestingly, one can go far beyond that to derive a limited memory version of PM-CBP, which maintains a constant number of states and respective messages. This is achieved using the following two observations: (i) by using proxy upper bounds for clique potentials, it is possible to represent all messages for non-resident states at a node by a single value, and (ii) at least one resident state can be made non-resident without decreasing the objective. It is therefore sufficient to maintain only three resident states per node. The method is outlined in Algorithm 2 (now including the framed instructions), and is explained in more detail in the following.

Group State "*":

The basic concept is to extend the use of upper bounds for unseen unary potentials (i.e. for non-resident states) to clique potentials. If any element of a clique state $x_\alpha$ is not resident (i.e. not in L(s)), the assigned potential $\hat{\theta}_\alpha(x_\alpha)$ is an upper bound of the true value. In the experiments described herein truncated pairwise potentials are used, hence an upper bound is easily available. Adding a state $x_s$ to the resident set does not only update $\hat{\theta}_s(x_s) \leftarrow \theta_s(x_s)$ (the true value), but it may also lead to the substitution $\hat{\theta}_\alpha(x_\alpha) \leftarrow \theta_\alpha(x_\alpha)$, if $x_\alpha$ consists now of only resident states. Since every unary and clique potential involving a non-resident state is constant for all states $x_s \notin L(s)$, it also implies that the messages $\lambda_{\alpha \to s}(x_s)$ after a node update will attain the same value for all $x_s \notin L(s)$. Hence, the set of messages $\{\lambda_{\alpha \to s}(x_s)\}_{x_s \notin L(s)}$ can be represented by a single value, which is denoted by $\lambda_{\alpha \to s}(*)$. The group state "*" simultaneously represents all non-resident states. Thus, introducing a single message for all non-resident states does not affect the validity of the basic PM-CBR algorithm. The resident sets L(s) will grow by one element in each pass. In order to have a fixed sized resident set, the "least active" state $x_s^-$ is discarded i.e. the state $x_s \in L(s)$ with the largest value of $v_s(x_s)$. That is, for each clique to which the node s belongs, there is an associated parameter $\mu_{\alpha \to s}(x_s)$, the associated parameter dependent on the possible pixel labels for node s. The one of the possible pixel labels $x_s^-$ which is removed from the resident set L(s) is the possible pixel label for which the sum $v_s(x_s)$ of the parameters $\mu_{\alpha \to s}(x_s)$ is greatest. Removal of $x_s^-$ from L(s) will therefore not reduce the objective.

Choice of $x_s^+$:

The state $x_s^+$ to add to L(s) was determined by scanning over all non-resident states in the previous section (recall (Eq 20)). If we maintain a small set of resident states L(s), this exhaustive scan may dominate the overall runtime complexity. Hence, it is sensible to generate potential candidates at node s based on resident states at neighbouring nodes t. Since (parametric) clique potentials usually encode smoothness assumptions, it is reasonable to randomly sample states using a density $p(x_s|x_{\alpha\backslash s}) \propto \exp(-\theta_\alpha(x_\alpha))$. Since we do not assume the potentials to be calibrated, there is a global scale ambiguity in addition to local bias ambiguities (one degree of freedom per clique), which do not affect the overall MAP solution. Therefore, in practice it is possible to estimate distribution parameters from training data. Training data can be ground truth labelings or MAP solutions generated by full-scale inference. The set of resident clique states not containing s are $$L(\alpha\backslash s) \stackrel{\text{def}}{=} \{x_{\alpha\backslash s}: x_t \in L(t)\} \quad \text{Eq. (21)}$$

which allows the definition of the random proposal sets, $$C_s(\alpha) = \bigcup_{x_{\alpha\backslash s} \in L(\alpha\backslash s)} \{x'_s \sim p(x'_s | x_{\alpha\backslash s})\} \quad \text{(Eq. 22)}$$

and $C(s) = \bigcup_{\alpha \ni s} C_s(\alpha) \backslash L(s)$. C(s) is the set of random proposal generated from neighbouring resident states (minus the already resident states at s). Finally, the new resident state $x_s^+$ is determined in analogy to (Eq. 20), $$x_s^+ \leftarrow \arg\min_{x_s \in C(s)} \sum_{\alpha \ni s} \min_{x_\alpha \backslash x_s} \left\{ \tilde{\vartheta}_\alpha(x_\alpha) - \sum_{t \in \alpha\backslash s} \lambda_{\alpha \to t}(x_t) \right\}.$$

If the estimated costs $\tilde{\vartheta}_\alpha$ are the true potential values or respective lower bounds and $p(x'_s|x_{\alpha\backslash s})$ assigns a positive probability to every state, such that every state $x_s$ is in infinitely often when T→∞, then limited memory PM-CBP will reach a stable point of the full inference problem. This follows from Result 3 and the fact that feasibility of the current messages are infinitely often tested. It also implies that maintaining messages for three states is sufficient: one for the group state *, one for an active state, and one slot for $x_s^-/x_s^+$.

The data structure for messages in limited memory PM-CBP can be just a fixed size array. The slots for $\lambda_{\alpha \to s}(x_s^-)$ can be reused for $\lambda_{\alpha \to s}(x_s^+)$. In general, the algorithm requires only fixed size, pre-allocated data structures, which is a large benefit for GPU or embedded implementations.

Figure 7:
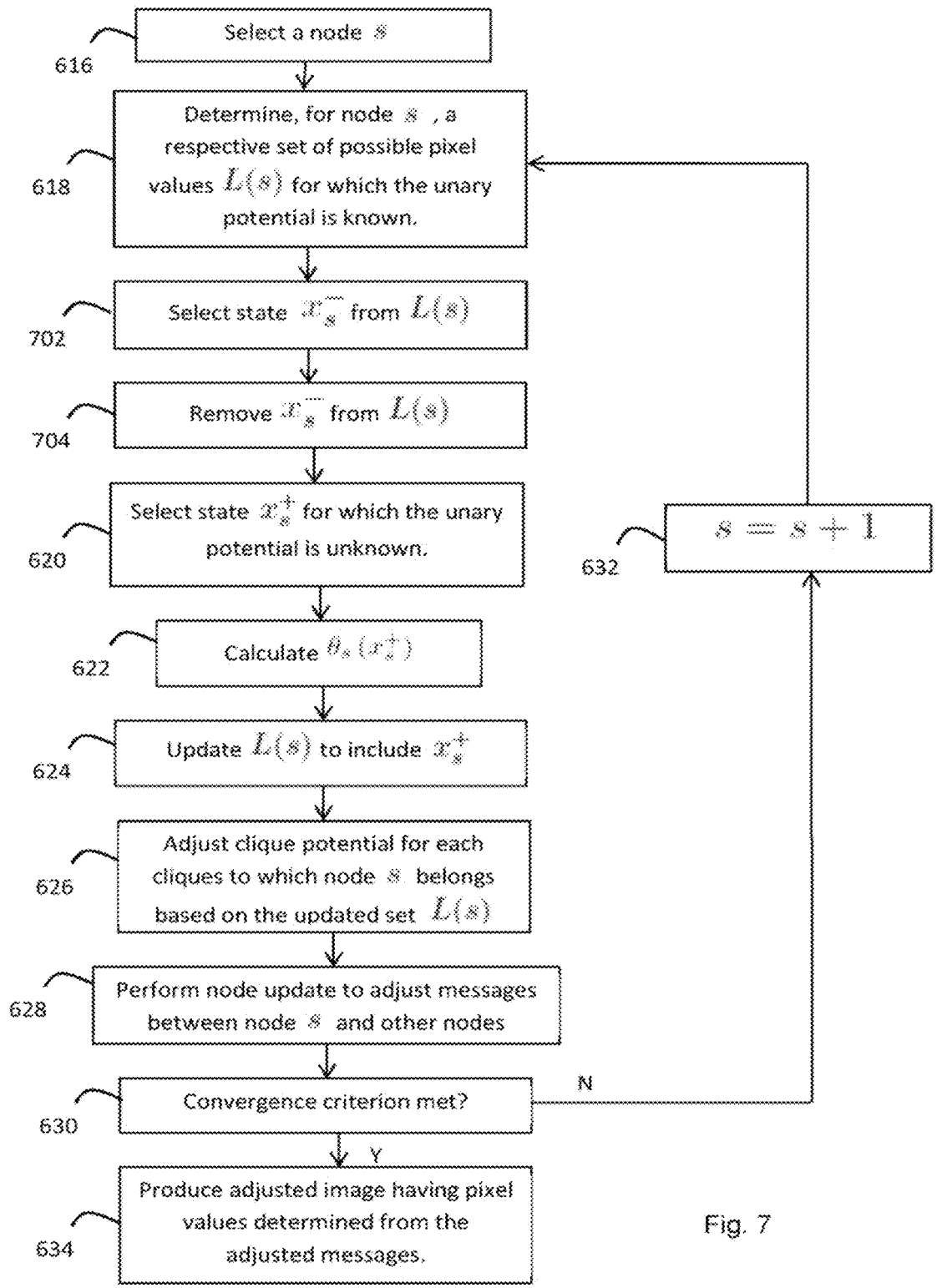
FIG. 7 is a flowchart illustrating an optional process that may be integrated with the process of FIG. 6.

An optional subprocess is now described in relation to FIG. 7, which may take place within the process described above in relation to FIG. 6. FIG. 7 therefore shows a number of steps already described above in relation to FIG. 6 and which are accordingly allocated the same reference numerals.

After step 618, in which a respective set L(s) of possible pixel labels is determined for node s the method proceeds to step 702 in which a state $x_s^-$ of L(s) is selected. As described above, the state $x_s^-$ may be selected based on a determination of the state with the greatest value of $v_s(x_s)$.

At step 704 the respective set of possible pixel labels L(s) is updated by removing one of the possible pixel labels therefrom. Accordingly, and with reference to (Eq. 19) above, in the array $\theta_s(x_s)$, the known unary potential $\theta_s(\Theta_s^-)$ is replaced with 1. As described above, this allows for the messages $\lambda_{\alpha \to s}(x_s^-)$ to be represented by the group state $\lambda_{\alpha \to s}(*)$.

After step 704, the method proceeds to step 620 in which a state for which the unary potential is unknown is selected, and the method proceeds as in FIG. 6. In this way, the resident set L(s) stays a constant size for each node update (step 626) of node s.

Applications

The methods described herein may be used to perform a number of image processing tasks, as described below. In particular, by performing the methods described herein a solution, or approximate solution, to a primal problem such as that of (Eq. 2) may be found in a time-efficient and memory-efficient manner. The image processing task performed on the image depends on the parameters used to define the problem.

The performance of the methods described herein on dense correspondence problems is demonstrated. The general parameters are as follows: PM-CBP is performed with 5 resident states (plus one to represent all non-resident states) for the indicated number of passes T followed by a fixed number of 32 convex BP iterations to refine the messages. Since a 4-neighborhood is used for the pairwise terms, the memory consumption is 6×4=24 times the image resolution floating point values. Primal solutions are extracted simply by reporting the state for each pixel with the smallest min-marginal $v_s(x_s)$. The algorithm is implemented in straightforward C++ with OpenMP enabled, and the runtimes are reported for a dual Xeon E5-2690 system with 64 Gb of main memory. GPU acceleration is not employed.

Figure 8:
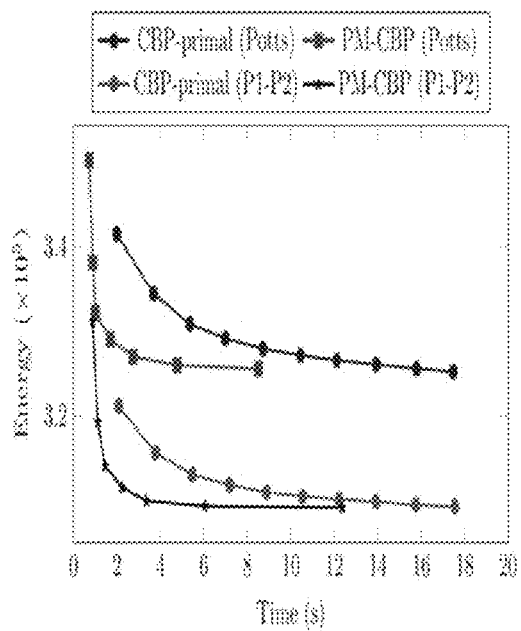
FIG. 8 shows graphical plots depicting the evolution of primal energies for dense disparity estimation with respect to wall time.
Figure 8:
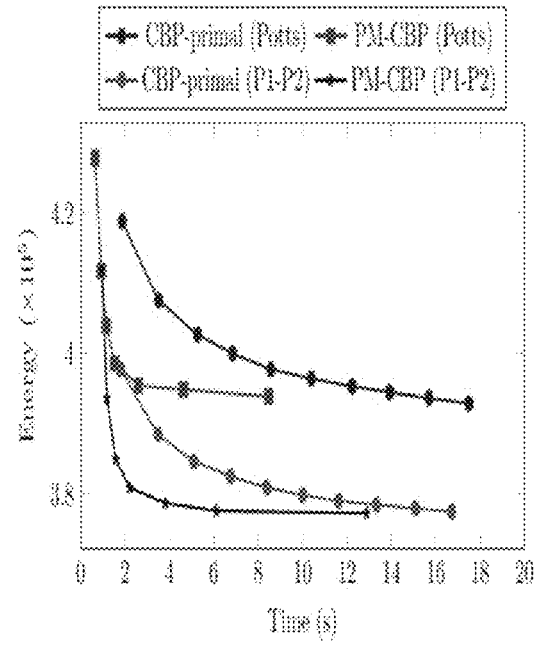
Figure 8:
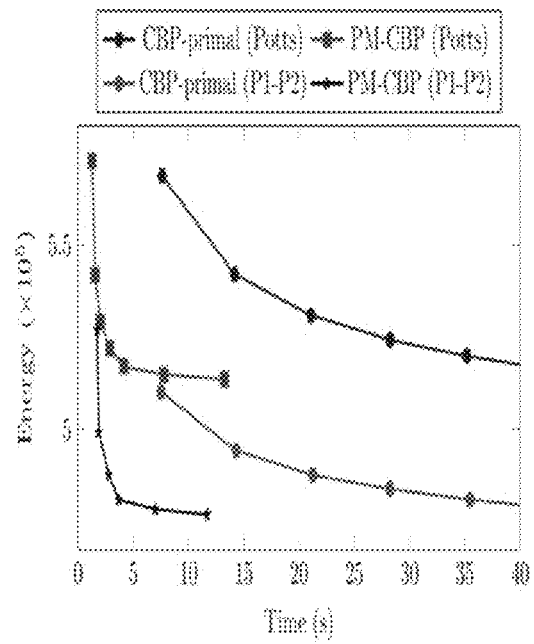
Figure 9:
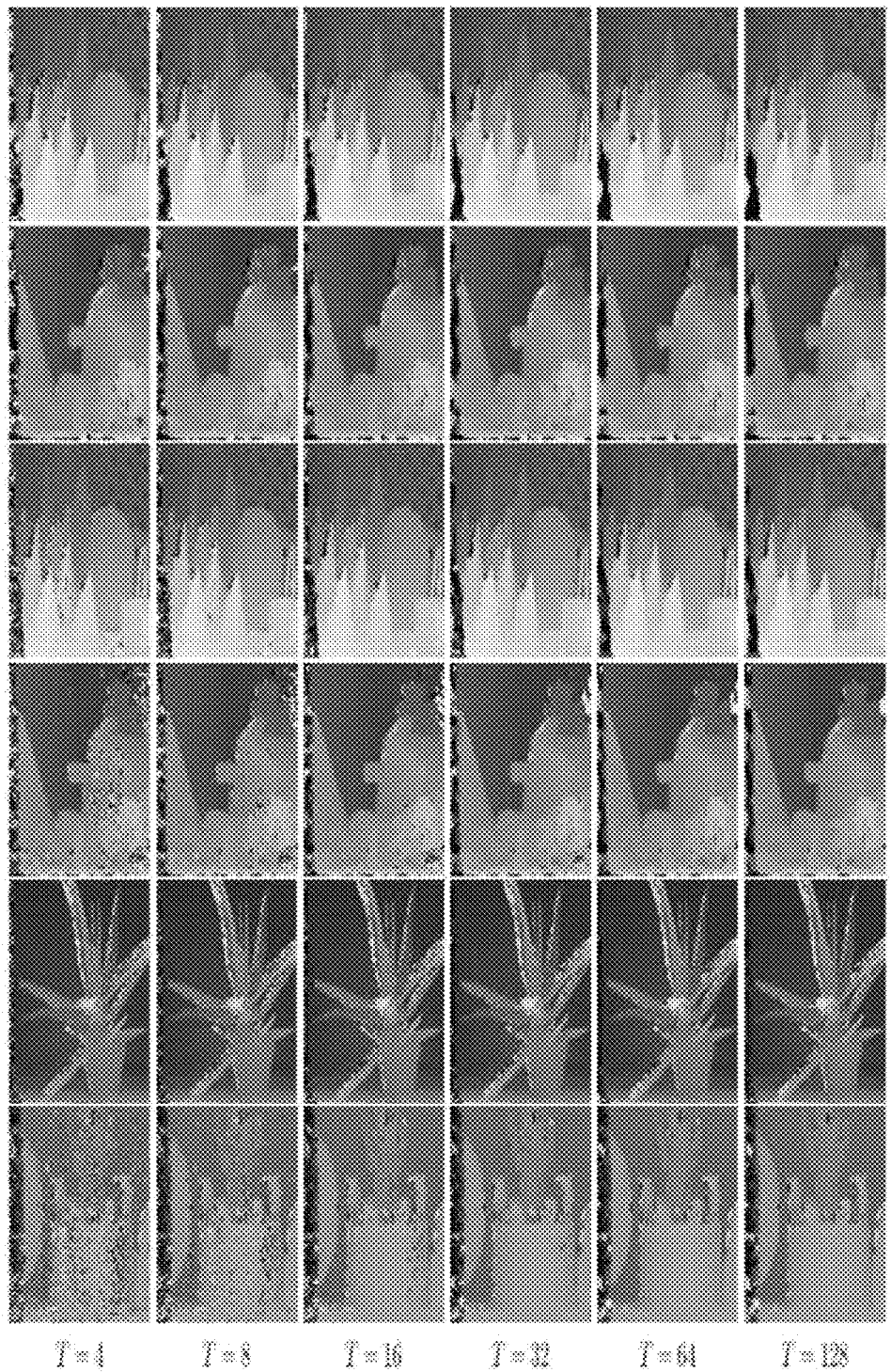
FIG. 9 is a visual illustration of converging stereo results.

Dense disparity estimation: Results are demonstrated on dense stereo instances from the Middlebury benchmark datasets. The state space contains integral disparity values and has between 60 and 240 elements (depending on the image pair). The data term (unary potential) attains values in [0; 1] and is given by $$\frac{1}{\tau}\min\left\{\tau, \frac{1-ZNCC}{2}\right\},$$

where ZNCC is the zero-mean NCC of 5×5 gray-scale images patches. τ is fixed to ½. Results are shown for two related pairwise potentials. The first one is a Potts smoothness model, and the second one is the 3-way pairwise potential $$\theta_{st}(x_s, x_t) = \begin{cases} 0 & \text{if } x_s = x_t \\ P_1 & \text{if } |x_s - x_t| = 1 \\ P_2 & \text{otherwise,} \end{cases} \quad \text{(Eq. 23)}$$

which is also known as the $P_1$-$P_2$ smoothness. From ground truth disparity maps the relative frequencies of events are estimated $x_s = x_t$ (≈94%), $x_s = x_t \pm 1$ (≈5.8%), and $|x_s - x_t| \geq 2$ (≈0.2%) for neighbouring pixels s, t. This defines how candidate states are sampled in Algorithm 2. FIG. 8 shows the evolution of the attained primal objective with respect to wall clock time for full scale convex BP (Algorithm 1) and limited memory PM-CBP. Clearly, PM-CBP achieves a lower energy much faster than convex BP with much lower memory requirements (5% for "Teddy" and "Cones", and 2.5% for "Aloe"). The corresponding labelling results returned by PM-CBP after T=4; 8; 16; 32; 64; 128 passes are illustrated in FIG. 9. FIG. 9 is a visual illustration of converging stereo results for the (starting at the top) "Cones", "Teddy", "Cones hires", "Teddy hires", "Aloe", and "Baby3" datasets after the respective number T of passes.

As the objective optimized in the above discussion is the dual program to the original linear (i.e. primal) program in (Eq. 2), a primal solution can be extracted by complementary slackness. In practice this means, that given a solution of (Eq. 3) an approximate solution of (Eq. 1) is obtained by setting $x_s^* = \arg\min_{x_s} v_s(x_s)$ (recall Eq. 7 for the definition of $v_s(x_s)$).

For dense disparity estimation the unknown label values are the disparities, and the unary potentials are computed by comparing the image patch centered at the current pixel in the reference image with the image patch in the "moving" image centered at the current pixel shifted by the disparity value under consideration. The comparison of image patches is based on a truncated zero-mean normalized cross correlation value.

Figure 10:
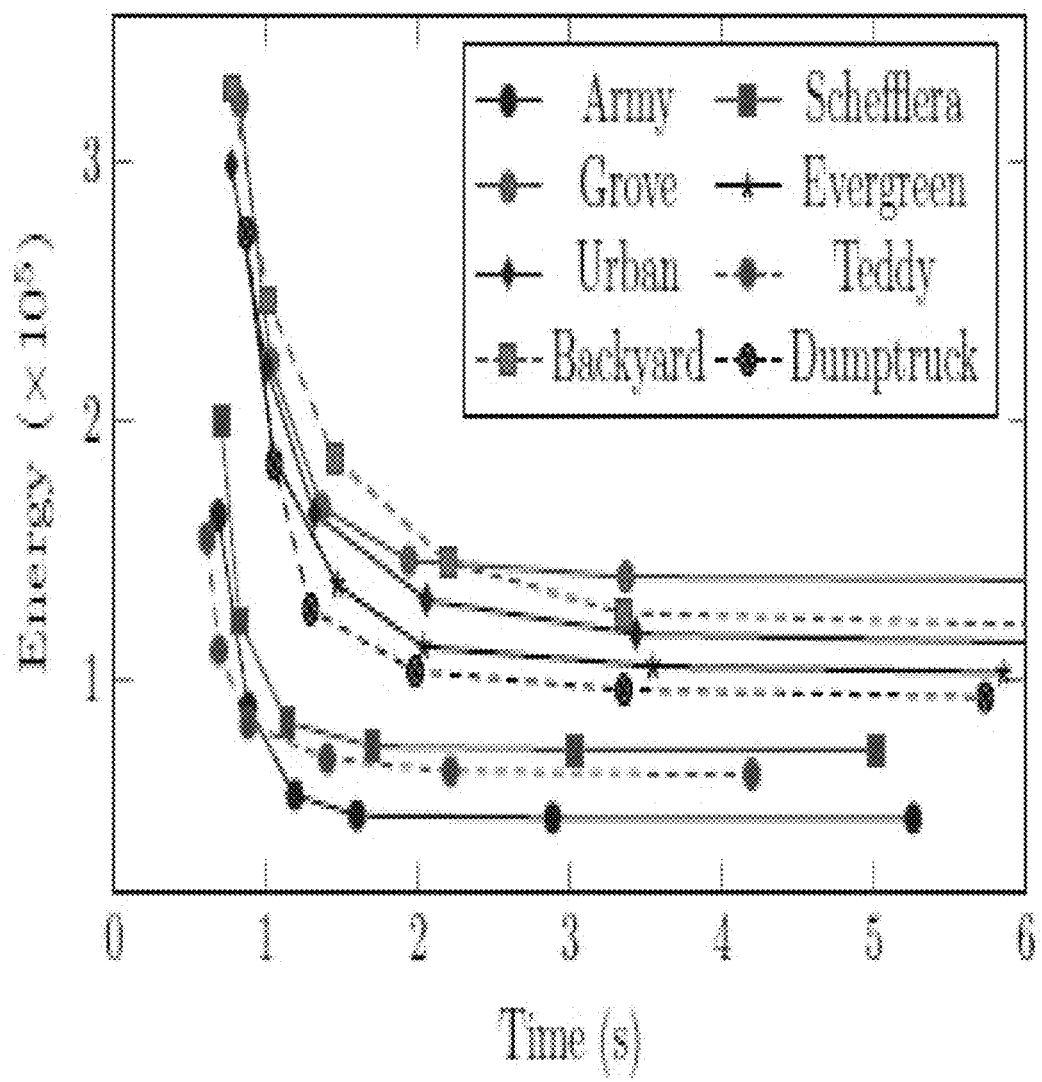
FIG. 10 shows the evolution of primal energies for dense optical flow.
Figure 11:
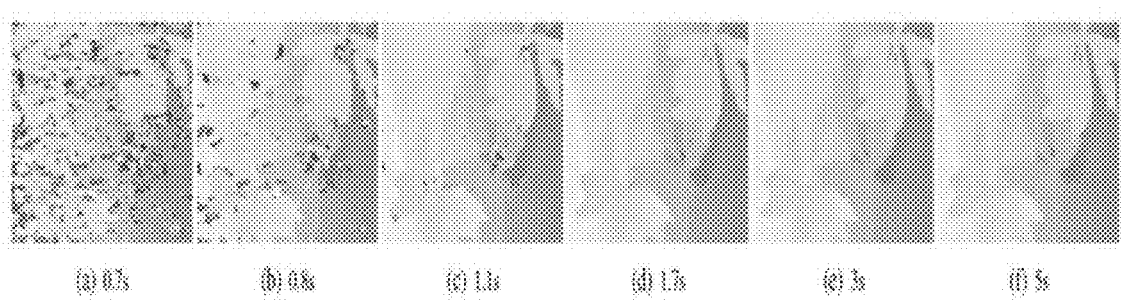
FIG. 11 is a visual illustration of the convergence of the optical flow field for the "Schefflera" dataset.
Figure 12:
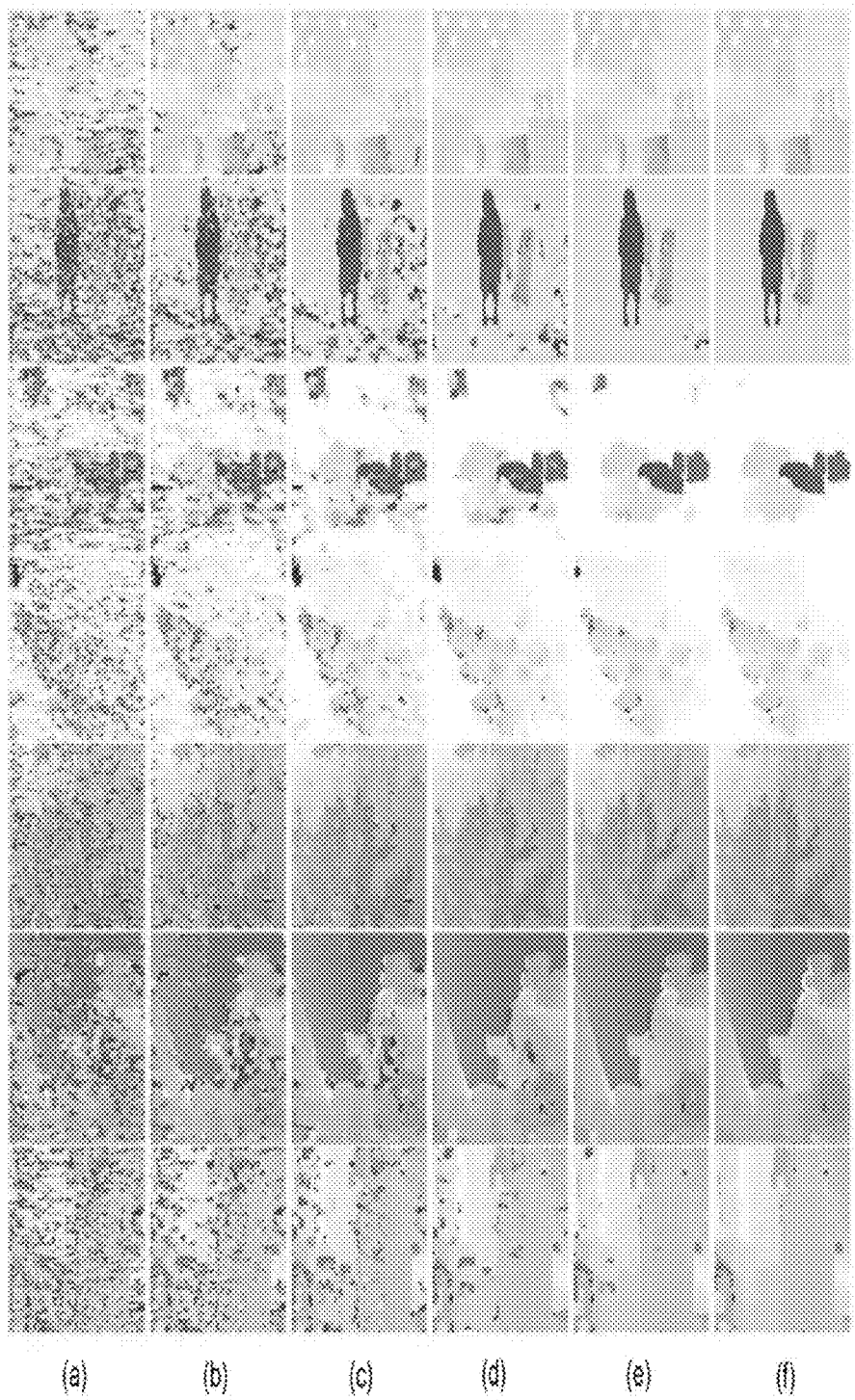
FIG. 12 is a visual illustration of converging optical flow fields for various datasets.

Optical Flow Estimation:

Similar numerical experiments were run for optical flow instances. The state space contains $129^2$ flow vectors corresponding to a 16 pixel search range at quarter-pixel accuracy. The original grayscale images were upscaled to 400% and the same ZNCC based score as for dense stereo was used (but computed on 11×11 patches from the upscaled images). The pairwise smoothness term is the $P_1$-$P_2$ model applied separately in the horizontal and vertical component of the motion vector. The decrease in primal energy for the solution returned after the respective number of passes with respect to wall clock time is shown in FIG. 10. In this case the memory consumption is $6/129^2$ or less than 0:04% of running full inference, and usable motion fields are obtained after a few seconds of CPU time. Visualizations of the corresponding flow fields are depicted in FIGS. 11 and 12 FIG. 11 is a visual illustration of the convergence of the optical flow field for the "Schleffera" dataset after a) 4, b) 8, c) 16, d) 32, e) 64 and f) 128 passes. FIG. 12 is a visual illustration of converging optical flow fields for various datasets after a) 4, b) 8, c) 16, d) 32, e) 64 and f) 128 passes. The color coding is similar to the Middlebury one, but uses higher saturated colors for better visibility.

Optical flow can be addressed in a very similar way to dense disparity estimation. In order to allow subpixel motion vectors, one can upscale the original pair of input images to 400% of the original size, and estimate integral motion vectors at this resolution. This yields quarter pixel motion vectors for the original image resolution.

Image Segmentation:

In this setting the pixel label values to infer are object categories such as "sky", "vegetation", "road", "building", "pedestrian", "car" etc. (these categories are useful if outdoor images are segmented, e.g. for medical images the categories might be different types of tissues and organs). The unary potentials can typically be trained from ground-truth data using a machine learning method, and the pairwise clique potential will be usually set to the Potts smoothness model, $\theta_{st}(x_s, x_t) = \tau$, if $x_s \neq x_t$ (with $\tau$ greater than 0), and 0 otherwise.

Image Denoising:

For image denoising the pixel label values are unknown pixel values. The unary potential is derived from the (known or assumed) noise model of the imaging sensor, and the pairwise (or higher-order) clique potentials encode desired image statistics (e.g. how correlated two neighbouring pixel values are in natural images).

Image Deblurring and Zooming:

Image deblurring and zooming may be carried out using a similar method to image denoising. However, a blur kernel is added to the unary potential for each pixel.

Variations of the described arrangements are envisaged. For example, receiving an image may comprise receiving data from an external data source and processing the received data to produce an image. Receiving an image may comprise generating an image.

In the above discussion, a received image comprises a plurality of pixels, each pixel having an input value and each input value corresponding to one of a number of possible pixel labels. The number of pixel labels may vary from node to node or may be constant. The number of possible pixel labels may depend on the application for which the methods described herein are used. For example, if a mask is to be generated, then the number of possible pixel labels may be 2, with a first pixel label being assigned to the pixel if a determination is made that the pixel is related to an object, and a second pixel label being assigned to the pixel if a determination is made that the pixel is not related to the object.

Cliques of the graph may be formed of any number of nodes. Any two cliques may contain the same or a different number of nodes. The assignment of a node to a particular clique may be performed based on the problem to be solved.

In the discussion above, in the course of Algorithm 2 the messages were initialised at 0. Messages may be initialised at any suitable value.

Determining, for a node, a respective set of possible pixel labels for which the unary potential is known, may comprise retrieving information concerning the respective set from memory.

Computing a unary potential of a selected possible pixel label for which the unary potential is unknown may comprise any suitable method for computing a unary potential. For example, one or more known unary potentials of possible pixel labels associated with adjacent nodes may be considered, and a suitable one of these unary potentials may be associated with the selected possible pixel label. For example, labels that are promising may be propagated to neighbouring pixels in order to rank candidate states to query the true data term.

The selected possible pixel label may be selected according to any criterion. In the discussion above, the pixel label $x_s^+$ was chosen as it was the based on a determination of the state with the smallest value of $v_s(x_s)$. However, the selected possible pixel label may be selected, for example, randomly.

Adjusting the clique potential for each clique to which a node belongs based on the unary potentials associated with the updated respective set of possible pixel labels may comprise, for example, weighting the unary potentials. For example, the unary potentials may be weighted evenly according to the number of nodes adjacent to the node under observation, or may be weighted unevenly.

Producing an adjusted image having pixel labels determined from adjusted messages may comprise producing a new image having pixel labels determined from adjusted messages. Alternatively, producing an adjusted image may comprise altering the pixel labels of the received input image.

The methods described herein work well if the unary potentials (data terms) are reasonably discriminative for most pixels. In cases when larger regions in the image are non-discriminative (e.g. uniformly coloured sky regions in a stereo image pair for dense depth computation), then the output of the algorithm can look "patchy". In order to avoid this, the algorithm may be run on lower resolution versions of the input image(s), followed by upscaling the obtained result. This result can be used to initialize one state in the resident set at the finer level. This scheme can be applied recursively, i.e. the algorithm can be run on very coarse images and subsequently rerun at higher resolutions with the upscaled result from the previous level used as initializer.

The described methods may be implemented by a computer program. The computer program which may be in the form of a web application or 'app' comprises computer-executable instructions or code arranged to instruct or cause a computer or processor to perform one or more functions of the described methods. The computer program may be provided to an apparatus, such as a computer, on a computer readable medium or computer program product. The computer readable medium or computer program product may comprise non-transitory media such as as semiconductor or solid state memory, magnetic tape, a removable computer memory stick or diskette, a random access memory (RAM), a read-only memory (ROM), a rigid magnetic disc, and an optical disk, such as a CD-ROM, CD-R/W, DVD or Blu-ray. The computer readable medium or computer program product may comprise a transmission signal or medium for data transmission, for example for downloading the computer program over the Internet.

An apparatus or device such as a computer may be configured to perform one or more functions of the described methods. The apparatus or device may comprise a mobile phone, tablet, laptop or other processing device. The apparatus or device may take the form of a data processing system. The data processing system may be a distributed system. For example, the data processing system may be distributed across a network or through dedicated local connections.

The apparatus or device typically comprises at least one memory for storing the computer-executable instructions and at least one processor for performing the computer-executable instructions.

While certain arrangements have been described, these arrangements have been presented by way of example only, and are not intended to limit the scope of the inventions. Indeed, the methods, apparatuses and systems described herein may be embodied in a variety of other forms; furthermore various omissions, substitutions and changes in the form of the apparatuses described herein may be made.

Examples are set out below in the following list of numbered clauses.

1. A computer implemented method for producing an adjusted image using message passing, the method comprising performing the following steps:
   i) receiving an input image that comprises a plurality of pixels, each pixel having an input value and each input value corresponding to one of a number of possible pixel labels;
   ii) associating each pixel with a node of a graph and one or more cliques of nodes,
   wherein each possible pixel label is associated with a unary potential, and wherein, for each permutation of possible pixel labels of the pixels associated with the nodes of each clique, a clique potential is associated;
   iii) for each clique, initialising at least one message between each pair of nodes of that clique;
   iv) for each node:
      a) determining, for that node, a respective set of possible pixel labels for which the unary potential is known;
      b) computing a unary potential of a selected possible pixel label for which the unary potential is unknown and updating the respective set of possible pixel labels to include the selected possible pixel label;
      c) for each clique to which that node belongs, based on the unary potentials associated with the updated respective set of possible pixel labels, adjusting the clique potential associated with that clique; and
      d) for each clique to which that node belongs, adjusting, based on the adjusted clique potential associated with that clique, at least one of the messages between that node and the other nodes of that clique;
   v) repeating step iv) until a convergence criterion is met; and
   vi) producing an adjusted image having pixel labels determined from the adjusted messages.

2. A method according to clause 1, wherein step iv) further comprises, after step a) and before step c), updating the respective set of possible pixel labels by removing one of the possible pixel labels therefrom.

3. A method according to clause 2, wherein for each clique to which that node belongs there is an associated parameter related to messages passed between that node and other nodes of that clique, the parameter dependent on the possible pixel labels for that node; and wherein the one of the possible pixel labels that is removed from the respective set of possible pixel labels is the possible pixel label of the respective set of possible pixel labels for which the sum of the associated parameters is greatest.

4. A method according to any preceding clause, wherein, at step c), adjusting the clique potential associated with that clique comprises adjusting the clique potential based on a weighted sum of the unary potentials associated with the respective set of possible pixel labels.

5. A method according to clause 4, wherein, at step c), adjusting the clique potential associated with that clique further comprises adding a constant value to the weighted sum for each possible pixel label which is not included in the respective set of possible pixel labels.

6. A method according to any preceding clause, wherein, at step b), the selected possible pixel label is selected from a candidate set of possible pixel labels, wherein the candidate set of possible pixel labels is based on an estimated set of possible pixel labels of an adjacent node for which the unary potential is known.

7. A method according to any preceding clause, wherein repeating step iv) until a convergence criterion is met comprises repeating step iv) a predetermined number of times.

8. A method according to any of clauses 1 to 6, wherein repeating step iv) until a convergence criterion is met comprises repeating step iv) until repetition of step iv) does not change the messages.

9. A method according to any preceding clause, wherein at step b), computing a unary potential of a selected possible pixel label comprises estimating a unary potential of the selected possible pixel label based on a unary potential associated with a possible pixel label of an adjacent node in the graph.

10. A method according to any preceding clause, wherein, at step d), adjusting at least one of the messages comprises adjusting the at least one of the messages according to one or more predetermined message weightings.

11. A method according to any preceding clause, wherein the unary potentials are configured so as to cause the method to perform one or more of the following operations upon the input image:
  segmentation;
  distortion correction;
  optical flow;
  dense stereo correspondence;
  image denoising, deblurring and zooming;

12. A method according to any preceding clause, wherein the clique potentials are initially configured so as to cause the method to perform one or more of the following operations upon the input image:
  segmentation;
  distortion correction;
  optical flow;
  dense stereo correspondence;
  image denoising, deblurring and zooming;

13. An apparatus or system arranged to perform the method of any preceding clause.

14. The apparatus or system of clause 13, wherein the apparatus or system comprises:
  input/output means arranged to receive an image;
  a memory storing instructions for causing a processor to perform steps of the method of any of clauses 1 to 12; and
  a processor for performing steps of the method of any of clauses 1 to 12.

15. A non-transitory computer-readable medium comprising machine-readable instructions arranged, upon execution by one or more processors, to cause the one or more processors to carry out the method of any of clauses 1 to 12.

The invention claimed is:

1. A computer implemented method for producing an adjusted image using message passing, the method comprising performing the following steps:
  i) receiving an input image that comprises a plurality of pixels, each pixel having an input value and each input value corresponding to one of a number of possible pixel labels;
  ii) associating each pixel with a node of a graph and one or more cliques of nodes,
  wherein each possible pixel label is associated with a unary potential, and wherein, for each permutation of possible pixel labels of the pixels associated with the nodes of each clique, a clique potential is associated;
  iii) for each clique, initialising at least one message between each pair of nodes of that clique;
  iv) for each node:
    a) determining, for that node, a respective set of possible pixel labels for which the unary potential is known;
    b) computing a unary potential of a selected possible pixel label for which the unary potential is unknown and updating the respective set of possible pixel labels to include the selected possible pixel label;
    c) for each clique to which that node belongs, based on the unary potentials associated with the updated respective set of possible pixel labels, adjusting the clique potential associated with that clique; and
    d) for each clique to which that node belongs, adjusting, based on the adjusted clique potential associated with that clique, at least one of the messages between that node and the other nodes of that clique;
  v) repeating step iv) until a convergence criterion is met; and
  vi) producing an adjusted image having pixel labels determined from the adjusted messages.

2. A method according to claim 1, wherein step iv) further comprises, after step a) and before step c), updating the respective set of possible pixel labels by removing one of the possible pixel labels therefrom.

3. A method according to claim 2, wherein for each clique to which that node belongs there is an associated parameter related to messages passed between that node and other nodes of that clique, the parameter dependent on the possible pixel labels for that node; and wherein the one of the possible pixel labels that is removed from the respective set of possible pixel labels is the possible pixel label of the respective set of possible pixel labels for which the sum of the associated parameters is greatest.

4. A method according to claim 1, wherein, at step c), adjusting the clique potential associated with that clique comprises adjusting the clique potential based on a weighted sum of the unary potentials associated with the respective set of possible pixel labels.

5. A method according to claim 4, wherein, at step c), adjusting the clique potential associated with that clique further comprises adding a constant value to the weighted sum for each possible pixel label which is not included in the respective set of possible pixel labels.

6. A method according to claim 1, wherein, at step b), the selected possible pixel label is selected from a candidate set of possible pixel labels, wherein the candidate set of possible pixel labels is based on an estimated set of possible pixel labels of an adjacent node for which the unary potential is known.

7. A method according to claim 1, wherein repeating step iv) until a convergence criterion is met comprises repeating step iv) a predetermined number of times.

8. A method according to claim 1, wherein repeating step iv) until a convergence criterion is met comprises repeating step iv) until repetition of step iv) does not change the messages.

9. A method according to claim 1, wherein at step b), computing a unary potential of a selected possible pixel label comprises estimating a unary potential of the selected possible pixel label based on a unary potential associated with a possible pixel label of an adjacent node in the graph.

10. A method according to claim 1, wherein, at step d), adjusting at least one of the messages comprises adjusting the at least one of the messages according to one or more predetermined message weightings.

11. A method according to claim 1, wherein the unary potentials are configured so as to cause the method to perform one or more of the following operations upon the input image:
  segmentation;
  distortion correction;
  optical flow;
  dense stereo correspondence;
  image denoising, deblurring and zooming.

12. A method according to claim 1, wherein the clique potentials are initially configured so as to cause the method to perform one or more of the following operations upon the input image:
- segmentation;
- distortion correction;
- optical flow;
- dense stereo correspondence;
- image denoising, deblurring and zooming.

13. An apparatus or system comprising:
- input/output means arranged to receive an image;
- a processor; and
- a memory storing instructions for causing a processor to perform the following steps:
  - i) receiving an input image that comprises a plurality of pixels, each pixel having an input value and each input value corresponding to one of a number of possible pixel labels;
  - ii) associating each pixel with a node of a graph and one or more cliques of nodes,
  - wherein each possible pixel label is associated with a unary potential, and wherein, for each permutation of possible pixel labels of the pixels associated with the nodes of each clique, a clique potential is associated;
  - iii) for each clique, initialising at least one message between each pair of nodes of that clique;
  - iv) for each node:
    - a) determining, for that node, a respective set of possible pixel labels for which the unary potential is known;
    - b) computing a unary potential of a selected possible pixel label for which the unary potential is unknown and updating the respective set of possible pixel labels to include the selected possible pixel label;
    - c) for each clique to which that node belongs, based on the unary potentials associated with the updated respective set of possible pixel labels, adjusting the clique potential associated with that clique; and
    - d) for each clique to which that node belongs, adjusting, based on the adjusted clique potential associated with that clique, at least one of the messages between that node and the other nodes of that clique;
  - v) repeating step iv) until a convergence criterion is met; and
  - vi) producing an adjusted image having pixel labels determined from the adjusted messages.

14. A non-transitory computer-readable medium comprising machine-readable instructions arranged, upon execution by one or more processors, to cause the one or more processors to perform the following steps:
  - i) receiving an input image that comprises a plurality of pixels, each pixel having an input value and each input value corresponding to one of a number of possible pixel labels;
  - ii) associating each pixel with a node of a graph and one or more cliques of nodes,
  - wherein each possible pixel label is associated with a unary potential, and wherein, for each permutation of possible pixel labels of the pixels associated with the nodes of each clique, a clique potential is associated;
  - iii) for each clique, initialising at least one message between each pair of nodes of that clique;
  - iv) for each node:
    - a) determining, for that node, a respective set of possible pixel labels for which the unary potential is known;
    - b) computing a unary potential of a selected possible pixel label for which the unary potential is unknown and updating the respective set of possible pixel labels to include the selected possible pixel label;
    - c) for each clique to which that node belongs, based on the unary potentials associated with the updated respective set of possible pixel labels, adjusting the clique potential associated with that clique; and
    - d) for each clique to which that node belongs, adjusting, based on the adjusted clique potential associated with that clique, at least one of the messages between that node and the other nodes of that clique;
  - v) repeating step iv) until a convergence criterion is met; and
  - vi) producing an adjusted image having pixel labels determined from the adjusted messages.

\* \* \* \* \*